United States Patent
Kanemoto

(10) Patent No.: US 10,324,588 B2
(45) Date of Patent: Jun. 18, 2019

(54) ORGANIZING APPLICATION ICON BASED ON USER HISTORY INFORMATION

(71) Applicant: SONY CORPORATION, Tokyo (JP)

(72) Inventor: Katsuyoshi Kanemoto, Chiba (JP)

(73) Assignee: SONY CORPORATION, Tokyo (JP)

( * ) Notice: Subject to any disclaimer, the term of this patent is extended or adjusted under 35 U.S.C. 154(b) by 166 days.

(21) Appl. No.: 15/311,529

(22) PCT Filed: May 27, 2015

(86) PCT No.: PCT/JP2015/065192
§ 371 (c)(1),
(2) Date: Nov. 16, 2016

(87) PCT Pub. No.: WO2015/190289
PCT Pub. Date: Dec. 17, 2015

(65) Prior Publication Data
US 2017/0160881 A1    Jun. 8, 2017

(30) Foreign Application Priority Data
Jun. 9, 2014    (JP) ................................ 2014-118610

(51) Int. Cl.
*G06F 3/0482* (2013.01)
*G06F 3/0481* (2013.01)
(Continued)

(52) U.S. Cl.
CPC ........ *G06F 3/0482* (2013.01); *G06F 3/04817* (2013.01); *G06N 20/00* (2019.01);
(Continued)

(58) Field of Classification Search
CPC ..... G06F 3/0482; H04L 67/306; H04W 4/029
See application file for complete search history.

(56) References Cited

U.S. PATENT DOCUMENTS

2010/0013780 A1* 1/2010 Ikeda ................. G06F 3/04883
345/173
2010/0269040 A1* 10/2010 Lee ..................... G06F 3/04817
715/702
(Continued)

FOREIGN PATENT DOCUMENTS

JP        06-348442 A    12/1994
JP        2007-293460 A  11/2007
(Continued)

*Primary Examiner* — Roland J Casillas
(74) *Attorney, Agent, or Firm* — Xsensus LLP

(57) ABSTRACT

The present technology relates to an information processing device, an information processing method, and a program with which convenience of a user in utilization of an application program can be improved.
An information acquisition unit acquires first information indicating a current situation including a current date and time and a current position of a user. A selection unit selects a presented application, which is an application program presented to a user, on the basis of a use history, a profile of the user, and the first information, the use history being a use history of an application program of a user and including second information indicating a situation in activation which situation includes a date and time and a position of the user in activation of each application program. The present technology can be applied, for example, to a device or a program that controls a display on a lock screen or a launcher screen.

19 Claims, 14 Drawing Sheets

(51) Int. Cl.
*H04L 29/08* (2006.01)
*H04M 1/725* (2006.01)
*G06N 20/00* (2019.01)
*H04W 4/029* (2018.01)

(52) U.S. Cl.
CPC ...... *H04L 67/306* (2013.01); *H04M 1/72522* (2013.01); *H04M 1/72572* (2013.01); *H04M 1/72586* (2013.01); *H04W 4/029* (2018.02)

(56) References Cited

U.S. PATENT DOCUMENTS

2014/0108978 A1* 4/2014 Yu .................. G06F 3/0482
715/765
2014/0201681 A1* 7/2014 Mahaffey .......... H04M 1/72569
715/846

FOREIGN PATENT DOCUMENTS

| JP | 2010-157207 A | 7/2010 |
| JP | 2012-198750 A | 10/2012 |
| JP | 2013-003685 A | 1/2013 |
| JP | 2013-025787 A | 2/2013 |
| JP | 2013-041378 A | 2/2013 |
| JP | 2013-200846 A | 10/2013 |
| JP | 2014-021608 A | 2/2014 |

* cited by examiner

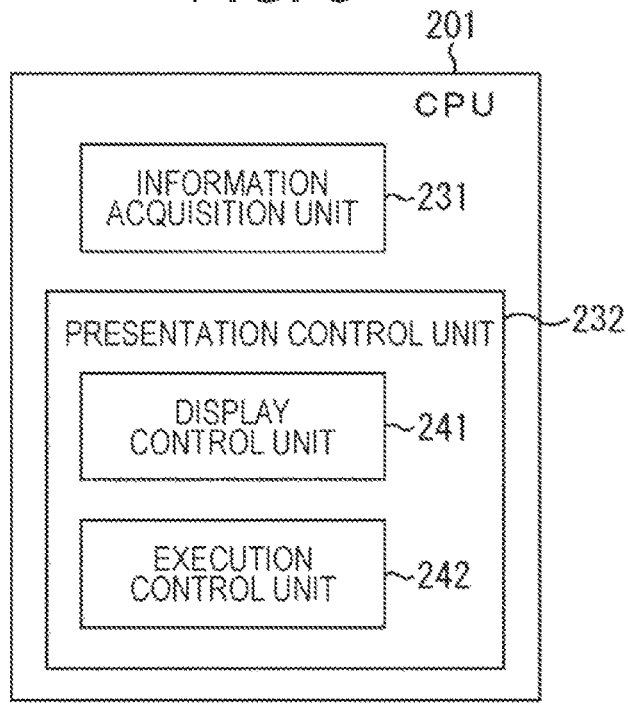
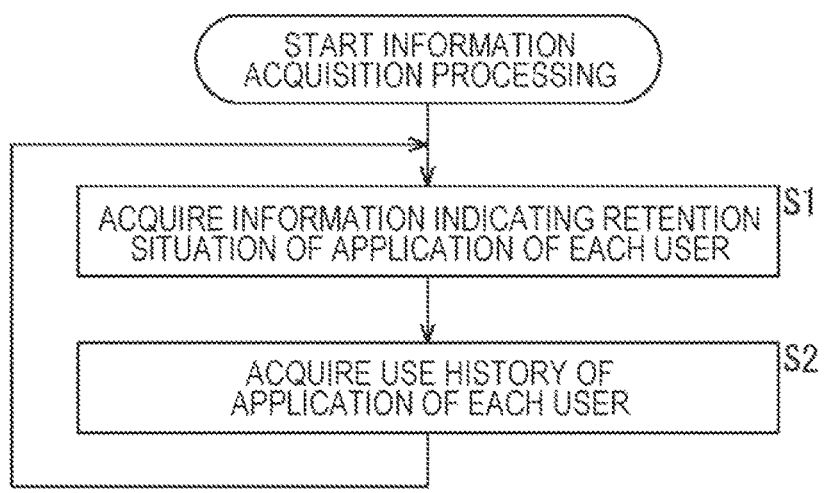

FIG. 15

| PLACE | ACTION | WEEKDAY (MONDAY TO FRIDAY) | | | WEEKEND (SATURDAY AND SUNDAY) | | |
|---|---|---|---|---|---|---|---|
| | | MORNING | DAYTIME | NIGHT | MORNING | DAYTIME | NIGHT |
| HOUSE | MOVING | NEWS | *1 | *1 | *1 | TRANSFER GUIDE MAP | *1 |
| | NON-MOVING | WEATHER FORECAST | *1 | CLOCK | BROWSER | BROWSER | BROWSER |
| OUTSIDE | MOVING | NEWS | TRANSFER GUIDE | *1 | TRANSFER GUIDE MAP | MAP | TRANSFER GUIDE |
| | NON-MOVING | *1 | SCHEDULE | *1 | *1 | RESTAURANT SEARCH | RESTAURANT SEARCH |
| OFFICE | MOVING | SCHEDULE | SCHEDULE | MAIL | *1 | *1 | *1 |
| | NON-MOVING | MAIL | BROWSER | BROWSER | *1 | *1 | *1 |
| UNKNOWN PLACE (PLACE THAT IS NOT IN HISTORY) | MOVING | *2 | *2 | *2 | *2 | *2 | *2 |
| | NON-MOVING | *2 | *2 | *2 | *2 | *2 | *2 |

ORGANIZING APPLICATION ICON BASED ON USER HISTORY INFORMATION

CROSS REFERENCE TO RELATED APPLICATIONS

This application is a U.S. National Phase of International Patent Application No. PCT/JP2015/065192 filed on May 27, 2015, which claims priority benefit of Japanese Patent Application No. JP 2014-118610 filed in the Japan Patent Office on Jun. 9, 2014. Each of the above-referenced applications is hereby incorporated herein by reference in its entirety.

TECHNICAL FIELD

The present technology relates to an information processing device, an information processing method, and a program and specifically relates to an information processing device, an information processing method, and a program with which convenience of a user in utilization of an application program is improved.

BACKGROUND ART

Conventionally, in an information processing device such as a mobile game device, it is proposed to calculate an interest level of a user on the basis of a utilization situation of an application program (hereinafter, simply referred to as application) or content and to arrange an application or content with a high interest level in a region that can be visually recognized or selected by a user easily in a menu (see, for example, Patent Document 1).

CITATION LIST

Patent Document

Patent Document 1: Japanese Patent Application Laid-Open No. 2014-21608

SUMMARY OF THE INVENTION

Problems to be Solved by the Invention

On the other hand, recently, along with a spread of a mobile information terminal such as a smartphone or a tablet, the number of applications that can be used in the mobile information terminal is increased. Then, when the number of applications installed into the mobile information terminal is increased, it becomes difficult for a user to find an intended application or operation processes necessary for activation of an intended application is increased.

The present technology is provided in view of such a situation and is to improve convenience of a user in utilization of an application program.

Solutions to Problems

An information processing device that is an aspect of the present technology includes an information acquisition unit that acquires first information indicating a current situation including a current date and time and a current position of a user, and a selection unit that selects a presented application, which is an application program presented to the user, on the basis of a use history, a profile of the user, and the first information, the use history being a use history of an application program of the user and including second information indicating a situation in activation which situation includes a date and time and a position of the user in activation of each application program.

The selection unit can select the presented application on the basis of a use history of a different user.

The different user can be a user similar to the user.

The similar user can be a user retaining a similar application program with the user.

The selection unit can select the presented application by using models that predict an activation probability of each application program and that are a first model generated on the basis of the use history of the user and a second model generated on the basis of the use history of the different user.

The selection unit can select the presented application from an application program, which is selected by utilization of a model of predicting an activation probability of each application program, and an application program similar to the selected application program.

The similar application program can be an application program a distribution of a retaining user of which program is similar to that of the selected application program.

In the selection unit, a display control unit that controls a display of an icon indicating the presented application on a predetermined screen is further provided and order of priority of the presented application is set. In a case where predetermined operation is performed on the screen, the display control unit can arrange and display a plurality of icons on the screen according to the order of priority and can display an icon of a presented application with high priority near a position where the operation is performed.

A display control unit that controls a display of an icon indicating the presented application on a predetermined screen is further provided. The selection unit sets order of priority of the presented application and the display control unit arranges and displays a plurality of icons on the screen according to the order of priority. A distance between an icon of a presented application with high priority and an adjoining icon can be increased.

A display control unit that controls a display of an icon indicating the presented application on a predetermined screen is further provided. The selection unit can set order of priority of the presented application and the display control unit can switch an icon displayed on the screen in accordance with the order of priority in response to a moving distance of a position specified on the screen by the user and can adjust the moving distance, which is necessary for switching the icon displayed on the screen, according to the order of priority.

A display control unit that controls a display of an icon indicating the presented application on a predetermined screen is further provided. The selection unit can set order of priority of the presented application. The display control unit can arrange and display a plurality of icons on the screen in accordance with the order of priority, can switch the icon displayed on the screen in accordance with the order of priority when a position specified by the user on the screen moves in a predetermined first direction, and can switch the icon displayed on the screen in accordance with opposite order of priority when the specified position moves in a second direction different from the first direction.

A display control unit that distinctively displays, on the screen, an icon indicating a presented application retained by the user and an icon indicating a presented application that is not retained by the user can be further provided.

A display control unit that controls a display of an icon indicating the presented application on a lock screen on which user operation is limited, and an execution control unit that releases, in a case where the icon is selected, the limitation in the user operation and brings the presented application corresponding to the selected icon into a usable state can be further provided.

The situation in the activation can include a state of the user in activation of an application program and the current situation can include a current state of the user.

A learning unit that generates a model of predicting an activation probability of each application program can be further provided and the selection unit can select the presented application by using the model.

The learning unit can generate, by using a predetermined periodic function, at least one of a first model of predicting an activation probability of each application program at a specified date and time and a second model of setting a plurality of representative points and predicting an activation probability of each application program at a specified position on the basis of the activation probability of each application at each of the representative points.

A communication unit that transmits information indicating a selection result of the presented application to a different information processing device can be further provided.

An execution control unit that brings the presented application into a usable state regardless of user operation can be further provided.

An information processing method that is an aspect of the present technology includes an information acquisition step of acquiring first information indicating a current situation including a current date and time and a current position of a user, and a selection step of selecting a presented application, which is an application program presented to the user, on the basis of a use history, a profile of the user, and the first information, the use history being a use history of an application program of the user and including second information indicating a situation in activation which situation includes a date and time and a position of the user in activation of each application program.

A program that is an aspect of the present technology causes a computer to execute processing including an information acquisition step of acquiring first information indicating a current situation including a current date and time and a current position of a user, and a selection step of selecting a presented application, which is an application program presented to the user, on the basis of a use history, a profile of the user, and the first information, the use history being a use history of an application program of the user and including second information indicating a situation in activation which situation includes a date and time and a position of the user in activation of each application program.

In one aspect of the present technology, first information indicating a current situation including a current date and time and a current position of a user is acquired, and a presented application that is an application program presented to the user is selected on the basis of a use history, a profile of the user, and the first information, the use history being a use history of an application program of the user and including second information indicating a situation in activation which situation includes a date and time and a position of the user in activation of each application program.

Effects of the Invention

According to an aspect of the present technology, an application program with a high probability of being used by a user can be selected as an application program to be presented to the user. As a result, convenience of a user in utilization of an application program is improved.

Note that an effect described herein is not the limitation and may be any of the effects disclosed in the present disclosure.

BRIEF DESCRIPTION OF DRAWINGS

FIG. 5 is a block diagram illustrating a configuration example of a function realized by a CPU of the client.

FIG. 6 is a flowchart for describing information acquisition processing.

FIG. 15 is a chart for describing a detailed example of a presented application.

MODE FOR CARRYING OUT THE INVENTION

In the following, a mode to carry out the present technology (hereinafter, referred to as embodiment) will be described. Note that the description will be made in the following order.
1. Embodiment
2. Modification example 1. Embodiment {Configuration Example of Information Processing System 1}

Figure 1:
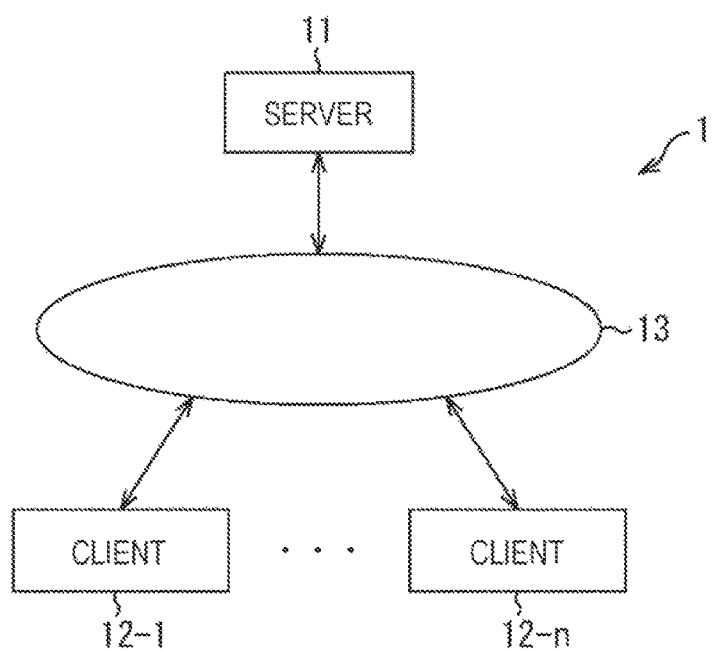
FIG. 1 is a block diagram illustrating an embodiment of an information processing system to which the present technology is applied.

In FIG. 1, an embodiment of an information processing system 1 to which the present technology is applied is illustrated.

The information processing system 1 includes a server 11 and clients 12-1 to 12-n. The server 11 and the clients 12-1 to 12-n are mutually connected through a network 13 and communicate with each other. As a communication system of the server 11 and clients 12-1 to 12n, an arbitrary communication system can be employed regardless of a wired or wireless manner.

The server 11 provides a service of supporting a user to activate an intended application (hereinafter, referred to as activation supporting service) by presenting an application, which corresponds to a situation, to a user using the clients 12-1 to 12-n. Also, the server 11 can provide, for example, an application necessary for using the activation supporting service (hereinafter, referred to as activation supporting application) to the clients 12-1 to 12-n.

As long as each of the clients 12-1 to 12-n is a device that can install and execute a plurality of applications and that can use the activation supporting service, an embodiment thereof is not limited. For example, the clients 12-1 to 12-n include a mobile information terminal such as a smartphone, a tablet, a mobile phone, or a notebook-type personal computer, a desktop-type personal computer, a game device, a moving image reproduction device, a music reproduction device, and the like. Also, the clients 12-1 to 12-n include wearable devices of various kinds such as a glasses-type, a watch-type, a bracelet-type, a necklace-type, a neckband-type, an earphone-type, a head set-type, and a head mount-type.

Note that in the following, the clients 12-1 to 12-n will be simply referred to as a client 12 when it is not necessary to distinguish these from each other.

{Configuration Example of Server 11}

Figure 2:
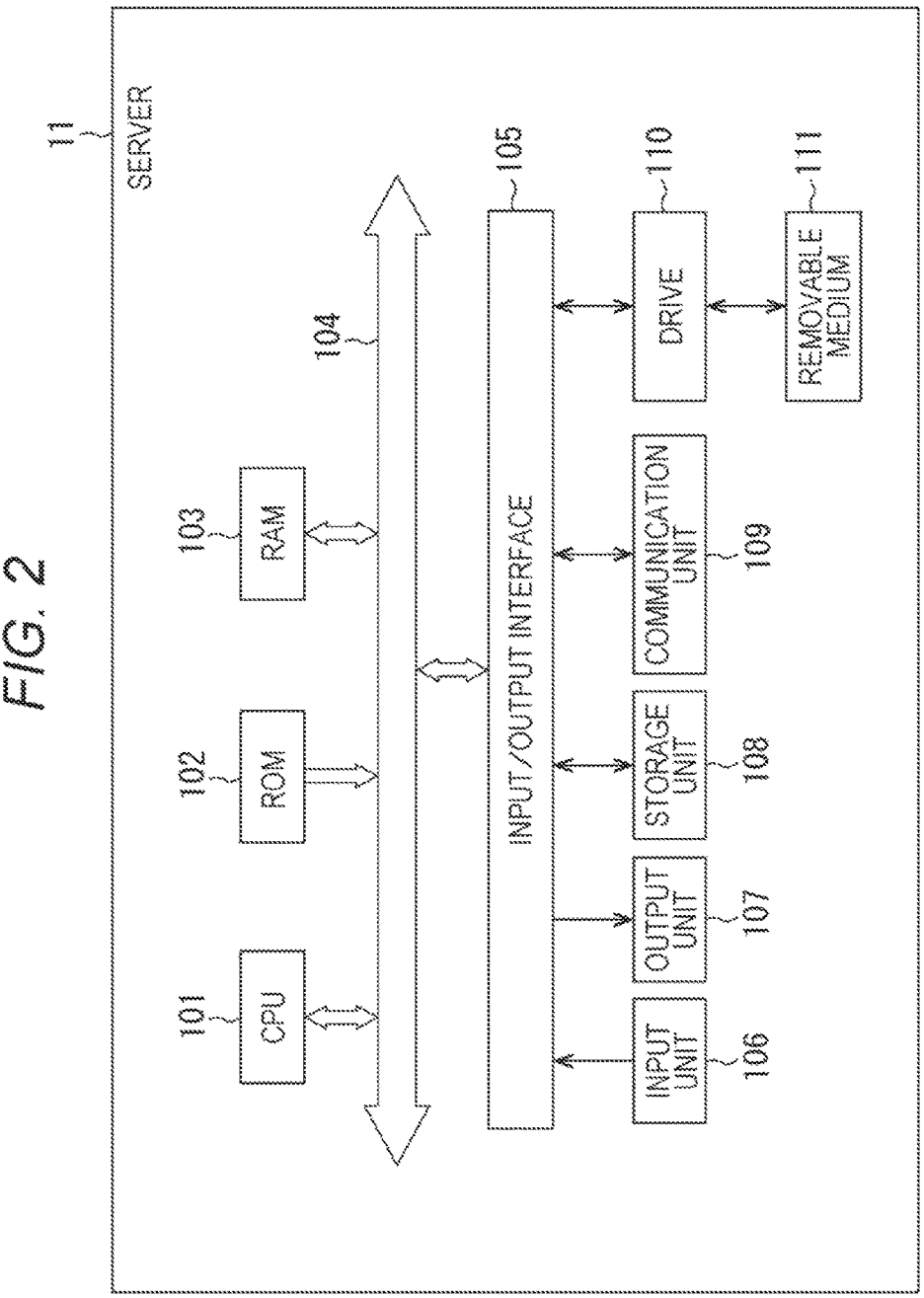
FIG. 2 is a block diagram illustrating a configuration example of a server.

In FIG. 2, a configuration example of the server 11 is illustrated.

In the server 11, a central processing unit (CPU) 101, a read only memory (ROM) 102, and a random access memory (RAM) 103 are mutually connected by a bus 104. To the bus 104, an input/output interface 105 is further connected. To the input/output interface 105, an input unit 106, an output unit 107, a storage unit 108, a communication unit 109, and a drive 110 are connected.

The input unit 106 includes, for example, an input device such as a keyboard, a mouse, or a microphone.

The output unit 107 includes, for example, a display or a speaker.

The storage unit 108 includes, for example, a hard disk or a nonvolatile memory.

The communication unit 109 includes, for example, a wired or wireless communication device or a network interface. To the communication unit 109, an arbitrary communication system can be applied. It is also possible to apply a plurality of communication systems.

The drive 110 drives, for example, a removable medium 111 such as a magnetic disk, an optical disk, a magneto optical disk, or a semiconductor memory.

In the server 11, for example, the CPU 101 loads a program stored in the storage unit 108 into the RAM 103 through the input/output interface 105 and the bus 104 and executes the program, whereby a series of processing is performed.

For example, the program executed by the server 11 (CPU 101) can be recorded in the removable medium 111, which functions as a package medium or the like, and provided. Also, the program can be provided through a wired or wireless transmission medium such as a local area network, the Internet, or a digital satellite broadcast.

In the server 11, when the removable medium 111 is mounted to the drive 110, the program can be installed into the storage unit 108 through the input/output interface 105. Also, the program can be received in the communication unit 109 through the wired or wireless transmission medium and can be installed into the storage unit 108. Alternatively, the program can be previously installed in the ROM 102 or the storage unit 108.

Note that in the following, in a case where each unit of the server 11 transmits/receives information or the like through the bus 104 or the input/output interface 105, a description of the bus 104 and the input/output interface 105 is omitted. For example, in a case where the communication unit 109 supplies reception data to the CPU 101 through the bus 104 and the input/output interface 105, a description of the bus 104 and the input/output interface 105 is omitted and it is expressed that the communication unit 109 supplies reception data to the CPU 101.

{Configuration Example of Function Realized by CPU 101 of Server 11}

Figure 3:
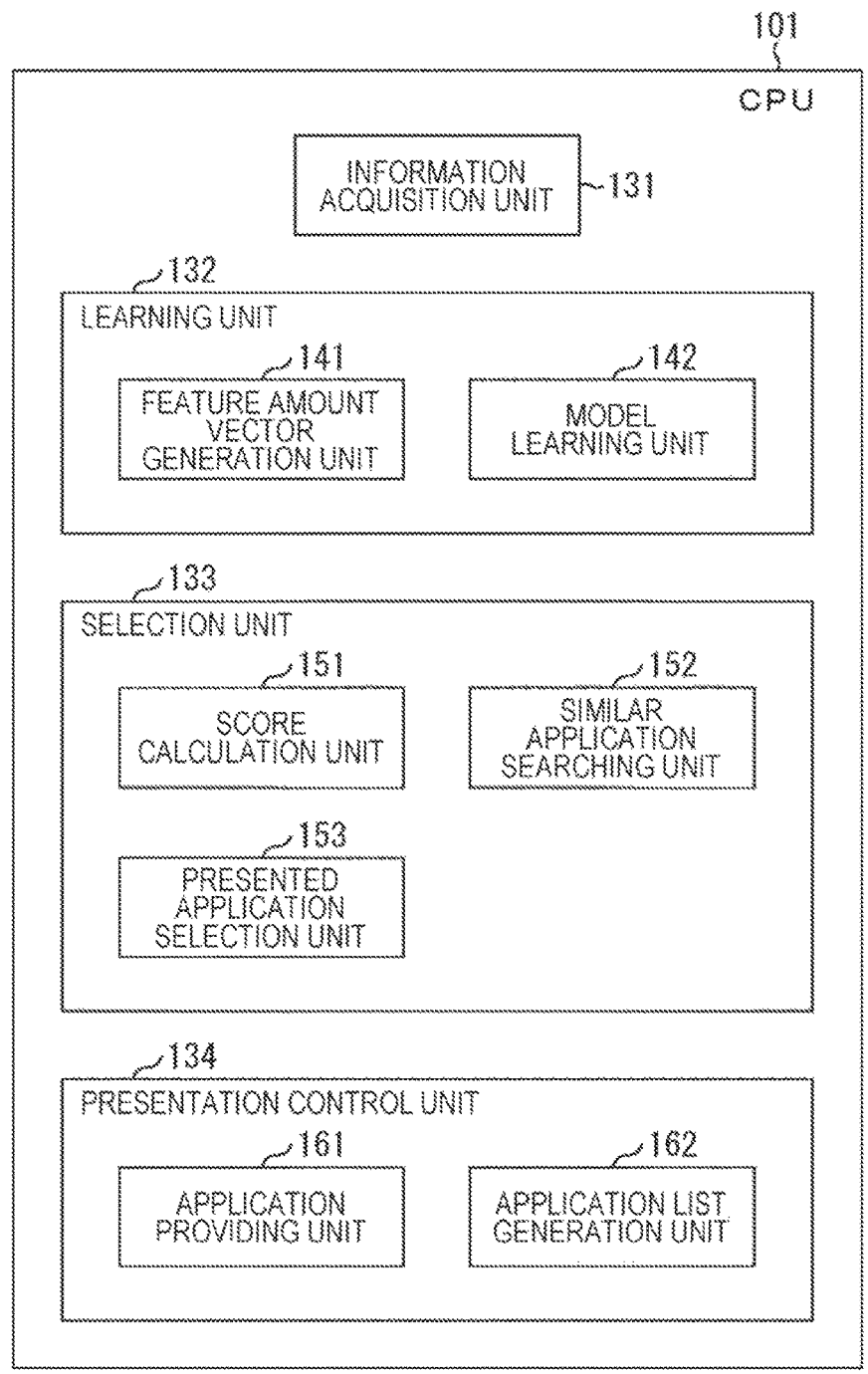
FIG. 3 is a block diagram illustrating a configuration example of a function realized by a CPU of the server.

FIG. 3 is a block diagram illustrating a configuration example of a function related to the present technology among functions realized by the CPU 101 of the server 11. When the CPU 101 executes a predetermined control program, a function including an information acquisition unit 131, a learning unit 132, a selection unit 133, and a presentation control unit 134 is realized.

The information acquisition unit 131 acquires information indicating application retention situation of each user (hereinafter, referred to as application retention information) from each client 12 through the network 13 and the communication unit 109. Also, the information acquisition unit 131 acquires a use history of an application of each user in each client 12 (hereinafter, referred to as application use history or simply referred to as use history) from each client 12 through the network 13 and the communication unit 109.

Note that in the following, data indicating an individual history in the application use history, that is, data in utilization of an application once is referred to as a log.

The learning unit 132 performs learning for presentation of an appropriate application to each user. The learning unit 132 includes a feature amount vector generation unit 141 and a model learning unit 142.

The feature amount vector generation unit 141 generates a feature amount vector indicating a feature of each application (hereinafter, referred to as application vector) on the basis of application retention information acquired from each client 12. Also, the feature amount vector generation unit 141 generates a feature amount vector indicating a feature amount of each user (hereinafter, referred to as user vector) on the basis of application retention information acquired from each client 12.

The model learning unit 142 performs learning of a model of predicting an activation probability of each application (hereinafter, referred to as activation prediction model) on the basis of an application use history of each user which history is acquired from each client 12 and a user vector of each user.

The selection unit 133 performs selection of an application presented to each user (hereinafter, referred to as presented application). The selection unit 133 includes a score calculation unit 151, a similar application searching unit 152, and a presented application selection unit 153.

The score calculation unit 151 calculates a score indicating an activation probability (likeliness to be activated) of each application (hereinafter, referred to as activation score) by using the activation prediction model generated by the model learning unit 142.

The similar application searching unit 152 searches for an application similar to a specified application (hereinafter, referred to as similar application) on the basis of an application vector of each application.

The presented application selection unit 153 selects a presented application, which is presented to a user, on the basis of an activation score of each application and a search result of a similar application. Also, the presented application selection unit 153 sets order of priority in a case of presenting a presented application to a user on the basis of an activation score or the like.

The presentation control unit 134 control presentation of a presented application to a user in each client 12. The presentation control unit 134 includes an application providing unit 161 and an application list generation unit 162.

The application providing unit 161 provides the activation supporting application to each client 12. For example, in response to a request from each client 12, the application providing unit 161 transmits an activated application to the client 12 at a source of the request through the communication unit 109 and the network 13.

The application list generation unit 162 generates an application list that is information indicating a selection result of a presented application. The application list generation unit 162 transmits the generated application list to the client 12 through the communication unit 109 and the network 13.

{Configuration Example of Client 12}

Figure 4:
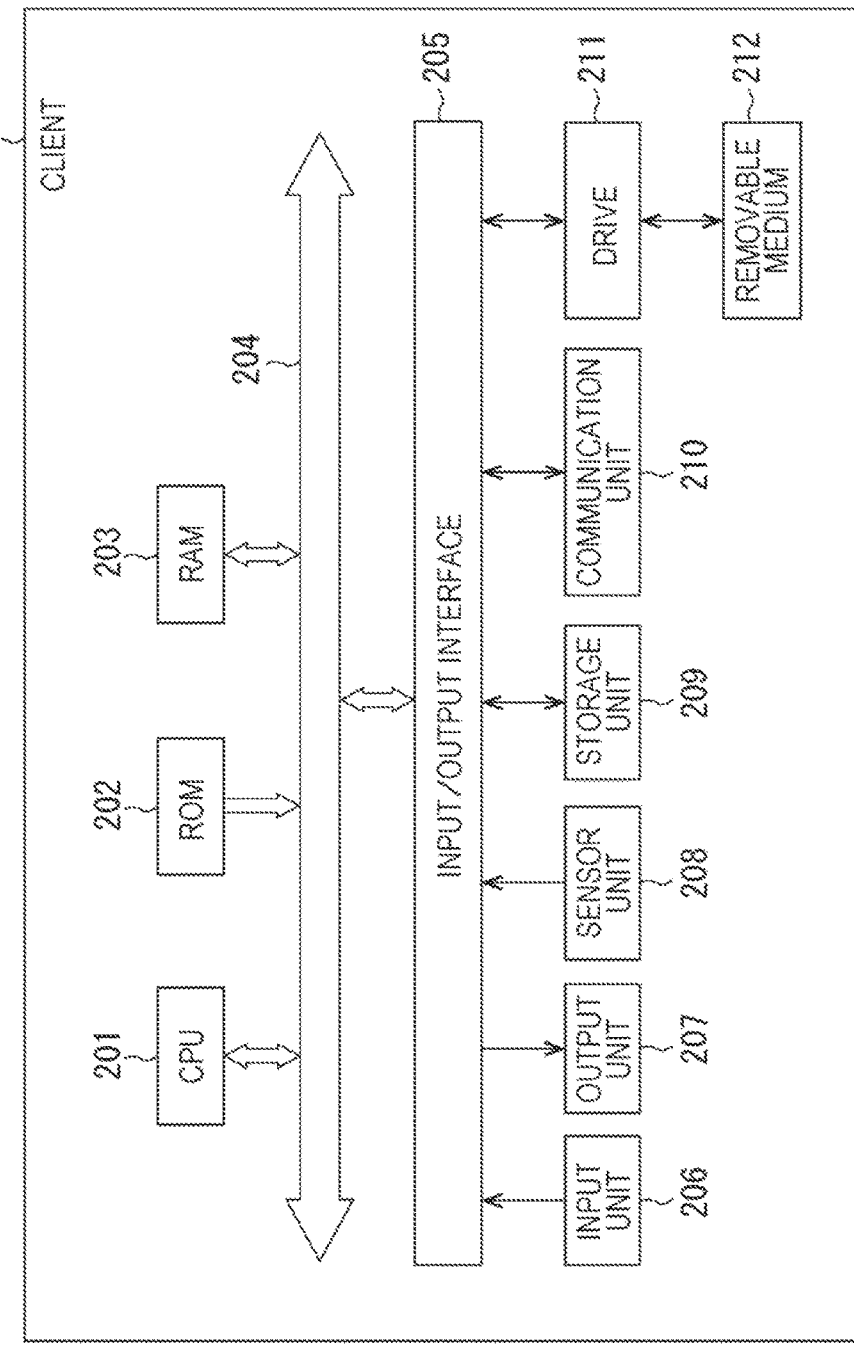
FIG. 4 is a block diagram illustrating a configuration example of a client.

In FIG. 4, a configuration example of the client 12 is illustrated.

In the client 12, a central processing unit (CPU) 201, a read only memory (ROM) 202, and a random access memory (RAM) 203 are mutually connected by a bus 204. To the bus 204, an input/output interface 205 is further connected. To the input/output interface 205, an input unit 206, an output unit 207, a sensor unit 208, a storage unit 209, a communication unit 210, and a drive 211 are connected.

The input unit 206 includes, for example, an input device such as a keyboard, a mouse, a button, a touch panel, a touchless interface, or a microphone.

The output unit 207 includes, for example, a display or a speaker.

The sensor unit 208 includes, for example, various sensors or receivers such as an acceleration sensor, a gyro sensor, an atmospheric pressure sensor, a global positioning system (GPS) receiver, and the like.

The storage unit 209 includes, for example, a hard disk or a nonvolatile memory.

The communication unit 210 includes, for example, a wired or wireless communication device or a network interface. To the communication unit 210, an arbitrary communication system can be applied. It is also possible to apply a plurality of communication systems.

The drive 211 drives, for example, a removable medium 212 such as a magnetic disk, an optical disk, a magneto optical disk, or a semiconductor memory.

In the client 12, for example, the CPU 201 loads a program stored in the storage unit 209 into the RAM 203 through the input/output interface 205 and the bus 204 and executes the program, wherein a series of processing is performed.

A program (including application program) executed by the client 12 (CPU 201) can be recorded, for example, in a removable medium 212, which functions as a package medium, and provided. Also, the program can be provided through a wired or wireless transmission medium such as a local area network, the Internet, or a digital satellite broadcast.

In the client 12, when the removable medium 212 is mounted to the drive 211, the program can be installed into the storage unit 209 through the input/output interface 205. Also, the program can be received in the communication unit 210 through the wired or wireless transmission medium and can be installed into the storage unit 209. Alternatively, the program can be previously installed in the ROM 202 or the storage unit 209.

Note that in the following, in a case where each unit of the client 12 transmits/receives information or the like through the bus 204 or the input/output interface 205, a description of the bus 204 and the input/output interface 205 is omitted. For example, in a case where the communication unit 210 supplies reception data to the CPU 201 through the bus 204 and the input/output interface 205, a description of the bus 204 and the input/output interface 205 is omitted and it is expressed that the communication unit 210 supplies reception data to the CPU 201.

Note that a configuration of the client 12 in FIG. 4 is an example and can be modified in various manners according to an embodiment of the client 12.

{Configuration Example of Function Realized by CPU 201 of Client 12}

FIG. 5 is a block diagram illustrating a configuration example of a function related to the present technology among functions realized by the CPU 201 of the client 12. When the CPU 201 executes a predetermined control program, a function including an information acquisition unit 231 and a presentation control unit 232 is realized. Also, the presentation control unit 232 includes a display control unit 241 and an execution control unit 242.

The information acquisition unit 231 investigates an application installed in the storage unit 209 and generates application retention information on the basis of a result of the investigation. Also, on the basis of information or the like from the input unit 206 and the sensor unit 208, the information acquisition unit 231 acquires information indicating a situation of a user in activation of an application, or the like and generates an application use history. The information acquisition unit 231 transmits the application retention information and the application use history to the server 11 through the communication unit 109 and the network 13.

The display control unit 241 controls displaying on a screen such as a display included in the output unit 207.

The execution control unit 242 controls execution of a program, which is necessary for processing by the client 12, such as an application program or an operating system.

Note that, for example, the display control unit 241 controls displaying of a presented application selected by the server 11 and the execution control unit 242 controls execution of the presented application selected by the server 11. In such a manner, when displaying or execution of a presented application is performed, a presented application is presented to a user.

{Processing by Information Processing System 1}

Next, processing by the information processing system 1 will be described with reference to FIG. 6 to FIG. 15.

(Information Acquisition Processing)

First, with reference to a flowchart in FIG. 6, information acquisition processing executed by the information processing system 1 will be descried.

In step S1, the information processing system 1 acquires information indicating a retention situation of an application program of each user (application retention information). For example, the information acquisition unit 231 of the client 12 investigates an application installed in the storage unit 209. Then, on the basis of a result of the investigation, the information acquisition unit 231 generates application retention information including an application ID of an application installed in the client 12 and a user ID of a user retaining the application. The information acquisition unit 231 transmits the application retention information to the server 11 through the communication unit 210 and the network 13.

Here, the application ID is an ID for uniquely identifying each application and a different value is assigned to each application. The user ID is an ID for uniquely identifying each user who uses an activation supporting service and a different value is assigned to each user.

Note that in a case where a plurality of users shares one client 12, for example, it is assumed that an application that does not limit a user thereof (such as application to which use license or the like is not set) is retained by each user.

The information acquisition unit 131 of the server 11 receives, through the communication unit 109, the application retention information transmitted from the client 12. The information acquisition unit 131 stores the received application retention information into the storage unit 108.

Note that timing at which each client 12 transmits the application retention information to the server 11 can be arbitrarily set. For example, each client 12 transmits application retention information to the server 11 when being requested by the server 11 or regularly. Also, for example, each client 12 transmits the application retention information to the server 11 in a case of logging into the activation supporting service or a case of activating the activation supporting application.

In step S2, the information processing system 1 acquires a use history of an application (application use history) of each user.

The information acquisition unit 231 of the client 12 acquires information indicating a situation in activation of an application from the input unit 206, the sensor unit 208, and the like each time the application is used. Here, the situation in activation of an application includes, for example, a date and time of the activation, a feature of a day of the activation, a position of a user (client 12) in the activation, a state of the user in the activation, and a state of surroundings of the user in the activation.

Here, the feature of a day of the activation includes, for example, a national holiday of a country of a user and an anniversary (such as birthday or wedding anniversary) of the user and a person related to the user (such as relative or friend). Note that the anniversary of the user and the person related to the user is investigated, for example, on the basis of a user profile including a user ID and personal information of a user registered in the client 12, contact information including contact information or personal information of a person with whom the user is in contact, schedule information of the user, or the like.

As the position of the user in the activation (hereinafter, also referred to as activation position), for example, positional information acquired by a GPS receiver included in the sensor unit 208 of the client 12 in the activation of the application is used. Also, in a case where the communication unit 210 of the client 12 performs wireless communication through an access point of Wi-Fi or the like, for example, an ID of an access point to which the client 12 is connected in the activation of the application is used as the position of the user in the activation.

The state of the user in the activation is, for example, a discrete state that is determined on the basis of time-series sensor data acquired from an acceleration sensor, a gyro sensor, an atmospheric pressure sensor, or the like included in the sensor unit 208 of the client 12. For example, the state of the user is classified according to contents of action of the user. Also, for example, the information acquisition unit 231 determines the state of the user by using a technology disclosed in Japanese Patent Application Laid-Open No. 2014-56585, or the like.

The state of surroundings of the user includes, for example, weather, temperature, humidity, atmospheric pressure, and the like of the surroundings of the user in the activation.

The information acquisition unit 231 generates an application use history including an application ID of a used application, a user ID of a user who uses the application, and information indicating a situation in activation of the application. The information acquisition unit 231 transmits the generated application use history to the server 11 through the communication unit 210 and the network 13.

The information acquisition unit 131 of the server 11 receives, through the communication unit 109, the application use history transmitted from the client 12. The information acquisition unit 131 stores the received application use history into the storage unit 108.

Then, the processing goes back to step S1 and the processing in and after step S1 is executed.

Note that timing at which each client 12 transmits the application use history to the server 11 can be arbitrarily set. For example, each time an application is used, each client 12 transmits an application use history with respect to the utilization in or after activation of the application. Alternatively, for example, each client 12 accumulates an application use history and transmits the accumulated application use history regularly or at predetermined timing.

Also, a part of information indicating a situation in activation of an application may be acquired by the server 11. For example, the information acquisition unit 131 of the server 11 may acquire information, which is related to a feature of a day of activation of an application, from a user profile, contact information, schedule information, and the like registered in the server 11 or a different server.

Note that an application use history may include, for example, information related to a utilization state of an application such as utilization time or a date and time of ending the utilization, a situation during the utilization, and a situation after the utilization. Also, the application use history may include, for example, information indicating n applications (n is equal to or larger than 1) activated most recently.

(Learning Processing)

Figure 7:
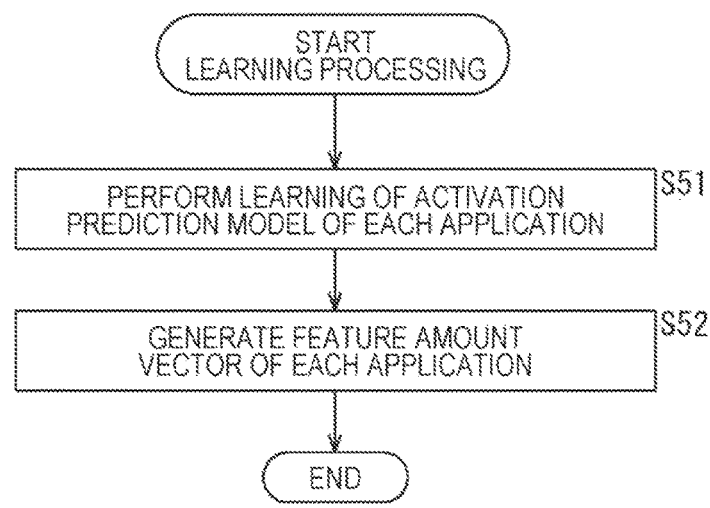
FIG. 7 is a flowchart for describing learning processing.

Next, with reference to a flowchart in FIG. 7, learning processing executed by the server 11 will be described. Note that, for example, this processing is executed regularly.

In step S51, the model learning unit 142 learns an activation prediction model of each application. More specifically, the model learning unit 142 acquires an application use history of each user from the storage unit 209. The model learning unit 142 learns an activation prediction model of each application on the basis of the acquired application use history.

(First Learning Method of Date-and-Time Activation Prediction Model)

There is an application a utilization frequency of which varies greatly depending on a date and time (including day of week). Thus, the model learning unit 142 learns an activation prediction model of predicting an activation probability of an application on the basis of a date and time (hereinafter, referred to as date-and-time activation prediction model).

For example, by using a periodic function such as the von Mises distribution expressed in an expression (1), the model learning unit 142 generates a date-and-time activation prediction model of outputting an activation score indicating an activation probability (likeliness to be activated) of each application at a specified date and time.

$$f(x|\mu,\sigma)=\exp\{\sigma\cos(x-\mu)\}/\{2\pi I_0(\sigma)\} \quad (1)$$

Here, x is a variable number in which a date and time is converted into a value from 0 to $2\pi$ in a predetermined cycle. $\mu$ is a variable number in which an activation date and time of an application is converted into a value from 0 to $2\pi$ in a cycle identical to that of x. $\sigma$ is a variable number indicating a width of a tail of a distribution and is set, for example, to a predetermined constant number. $I_0(\sigma)$ is a Bessel function with $\sigma$ as a variable number.

Here, a case of generating a date-and-time activation prediction model for an application a1 of a user u1 will be described.

For example, by using the expression (1), the model learning unit 142 generates, for each log of a use history of the application a1 of the user u1, a distribution in a case where an activation date and time of the application a1 are expressed in a 24-hour cycle and a distribution expressing those in a 7-day (1-week) cycle. $\mu$ in the expression (1) is expressed by a value in which 24 hours are converted into a value from 0 to $2\pi$ in a case of the 24-hour cycle and is expressed by a value in which seven days are converted into a value from 0 to $2\pi$ in a case of the 7-day cycle.

Then, the model learning unit 142 adds a distribution in which the activation date and time of the application a1 are expressed in the 24-hour cycle and a distribution in which those are expressed in the 7-day cycle are added in the same time axis for all logs of the use history of the application a1 of the user u1. Here, normalization may be performed in such a manner that an integrated value in a whole cycle (for one week) of a distribution of an activation date and time after the addition becomes 1. Accordingly, the distribution of the activation date and time after the addition can be used as an activation probability distribution of the application a1 based on a day in the week and time. Also, the model learning unit 142 may add the distribution in the 24-hour cycle and the distribution in the 7-day cycle with weight.

Figure 8:
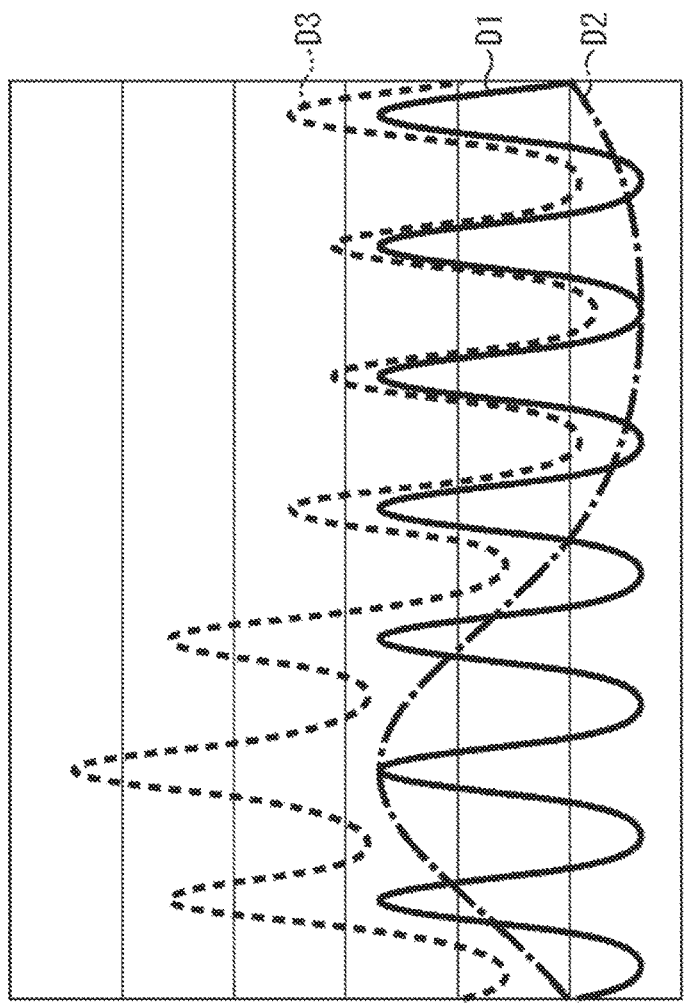
FIG. 8 is a graph illustrating an example of a graph indicating a distribution of an activation date and time of an application by using the von Mises distribution.

In FIG. 8, an example of a graph indicating a distribution of an activation date and time of the application a1 by using the von Mises distribution is illustrated. Note that a horizontal axis indicates a time axis for one week.

A graph D1 is a graph indicating a distribution of an activation date and time of the application a1 in a 24-hour cycle and a graph D2 is a graph indicating a distribution of an activation date and time of the application a1 in a 7-day cycle. A graph D3 is a graph in which the graph D1 and the graph D2 are added.

In such a manner, a date-and-time activation prediction model with respect to the application a1 of the user u1 is generated. Also, by a similar method, a date-and-time activation prediction model with respect to each application of each user is generated. This date-and-time activation prediction model generated for each user is a model on which a tendency of a date and time at which each application of each user is activated is reflected.

Also, the model learning unit 142 classifies users into a plurality of groups and generates a date-and-time activation prediction model with respect to each application for each group. That is, by a method similar to the above-described method, the model learning unit 142 generates a date-and-time activation prediction model with respect to each application for each group by using application use histories of all members in each group.

Note that a method of classification into groups is arbitrary. The number of groups and a size of a group are arbitrary.

For example, the feature amount vector generation unit 141 generates a user vector of each user on the basis of application retention information of each user. For example, in a case where the total number of applications is M, a feature amount in an i dimension of a user vector (however, $0 \leq i \leq M$) indicates whether a target user retains the ith application. Then, the feature amount in the i dimension of the user vector is set to 1 in a case where the target user retains the ith application, and is set to 0 in a case where the application is not retained.

Next, the model learning unit 142 calculates a degree of similarity between user vectors of users by using the Jaccard coefficient or the like. Then, the model learning unit 142 classifies the users into a plurality of groups on the basis of the calculated degree of similarity. Accordingly, a plurality of groups to each of which users retaining similar applications belong is generated. For example, a group to which users retaining many business-related applications belong and a group to which users retaining many entertainment-related applications such as games belong are generated.

Note that the model learning unit 142 may subdivide each group according to a demographic of each user such as an age, a gender, a nationality, or a resident place (such as resident country or region).

Also, for example, the model learning unit 142 may classify users into a plurality of groups on the basis of a degree of similarity in a part or all of items in demographics of the users without using user vectors.

A date-and-time activation prediction model generated for each group becomes a model on which a tendency of a date and time at which each application of each group (group of similar user) is activated is reflected.

Moreover, for example, by a method similar to the above-described method, the model learning unit 142 generates a date-and-time activation prediction model of each application with respect to all users by using application use histories of all users. This date-and-time activation prediction model becomes a model on which a general tendency of a date and time of activation of each application is reflected.

(Second Learning Method of Date-and-Time Activation Prediction Model)

Note that in the above-described learning processing of a date-and-time activation prediction model, real-time processing becomes difficult when the number of logs of an application use history becomes large.

Then, in a case where the number of logs of an application use history becomes large, the model learning unit 142 may treat a date and time (time information) in a discretized manner and may generate a discretized date-and-time activation prediction model. For example, the model learning unit 142 divides one week into 604,800 divisions (=3600 second×24 hour×7 day) in a unit of one second by offline batch processing and tallies, for each section, the number of times of activation of each application of each user. Then, on the basis of the number of times of activation or order based on the number of times of activation of each application in each division, the model learning unit 142 generates a date-and-time activation prediction model of calculating, for each division, an activation score with respect to each application of each user.

Similarly, the model learning unit 142 tallies, for each division, the number of times of activation of each application of each group. Then, on the basis of the number of times of activation or order based on the number of times of activation of each application in each division, the model learning unit 142 generates a date-and-time activation prediction model of calculating, for each division, an activation score with respect to each application of each group.

Also, the model learning unit 142 tallies, for each division, the number of times of activation of each application of all users. Then, on the basis of the number of times of activation or order based on the number of times of activation of each application in each division, the model learning unit 142 generates a date-and-time activation prediction model of calculating, for each division, an activation score with respect to each application of all users.

(First Learning Method of Positional Activation Prediction Model)

Also, there is an application a utilization frequency of which varies greatly depending on a position of a user. Thus, the model learning unit 142 generates an activation prediction model of predicting an activation probability of an application on the basis of a position of a user (hereinafter, referred to as positional activation prediction model).

For example, in a case where positional information acquired with a GPS receiver or the like is input, the model learning unit 142 generates a date-and-time activation prediction model of outputting an activation score of each application at the input position.

For example, the model learning unit 142 generates the positional activation prediction model by using a k-NN method. Here, a case of generating a positional activation prediction model of the user u1 will be described.

For example, the model learning unit 142 generates, as a positional activation prediction model, a distribution based on activation positions of an application in all logs included in an application use history of the user u1.

Then, for example, in a case where a current position of (client 12 used by) the user u1 is input, the score calculation unit 151 extracts k logs in ascending order of a distance from an activation position to an input position (hereinafter, referred to as input position). Then, for example, the score calculation unit 151 adds, for each application, scores corresponding to a distance between an activation position in each of the extracted k logs and the input position. Note that a score becomes higher as an activation position becomes closer to an input position. Then, the score calculation unit 151 sets the score after the addition for each application as an activation score of each application. Thus, an application with the greater number of times of activation in a vicinity of a current position of a user has a higher activation score. Also, an application activated at a position closer to a current position of a user has a higher activation score.

In such a manner, a positional activation prediction model of the user u1 is generated and an activation score with respect to each application at a current position of the user u1 is calculated by utilization of the generated positional activation prediction model. Also, by a similar method, a positional activation prediction model of each user is generated and an activation score with respect to each application at a current position of each user is calculated by utilization of each generated positional activation prediction model. The positional activation prediction model generated for each user is a model on which a tendency of a position at which each application of each user is activated is reflected.

Also, the model learning unit 142 divides users into a plurality of groups as described above and generates a positional activation prediction model for each group by using application use histories of all members in each group according to a method similar to the above-described method. This date-and-time activation prediction model generated for each group becomes a model on which a tendency of a position at which each application of each group (group of similar user) is activated is reflected.

Moreover, by a method similar to the above-described method, the model learning unit 142 generates a positional activation prediction model for all users by using application use histories of all users. This positional activation prediction model becomes a model on which a general tendency of a position of activation of each application is reflected.

(Second Learning Method of Positional Activation Prediction Model)

In the first learning method of a positional activation prediction model, real-time processing becomes difficult, for example, in a case where the number of users becomes large and the number of logs of an application use history becomes large. Thus, for example, a plurality of representative points may be previously set and an activation score (activation probability) of each application at each representative point may be calculated, and an activation score of each application at a specified position (input position) may be calculated on the basis of an activation score at each representative point.

For example, the model learning unit 142 randomly extracts a predetermined number of logs from an application use history of the user u1. Note that in a case where there is a margin in processing time, the model learning unit 142 may extract all logs in the application use history of the user u1. Then, on the basis of a distribution of activation positions in the extracted logs, the model learning unit 142 sets a predetermined number of representative points with respect to the user u1 by using a clustering method such as k-means. Here, only an activation position of an application is considered and a kind of an application is not considered. Also, density of representative points is set to be high at a place, such as a city center area, where density of activation positions of an application is high and density of representative points is set to be low at a place, such as a suburb, where density of activation positions of an application is low.

By a similar method, an application use history of each user is used and a representative point of each user is set. Note that this processing of setting a representative point can be performed by batch processing.

Next, the model learning unit 142 calculates an activation score with respect to each application of the user u1 at each representative point. More specifically, for example, the model learning unit 142 extracts, from the application use history of the user u1, k1 logs in ascending order of a distance from an activation position to a representative point p1. Then, the model learning unit 142 adds, for each application, scores corresponding to a distance between an activation position in each of the extracted k1 logs and the representative point p1. Note that a score becomes higher as an activation position becomes closer to the representative point p1.

Then, as an activation score with respect to each application of the user u1 at the representative point p1, the model learning unit 142 sets a score after the addition of each application. Also, the model learning unit 142 calculates, with respect to a different representative point, an activation score with respect to each application of the user u1 by similar processing. This model including an activation score with respect to each application at each representative point becomes a positional activation prediction model of the user u1.

Also, by a similar method, an activation score with respect to each application of each user at each representative point is calculated.

Note that this processing of calculating an activation score at each representative point can be performed by batch processing.

Then, for example, in a case where a current position of (client 12 used by) the user u1 is input, the score calculation unit 151 extracts k2 representative points in ascending order of a distance to an input position among representative points with respect to the user u1. Next, the score calculation unit 151 adds, for each application, activation scores with respect to each application of the user u1 at the extracted k2 representative points. Here, the score calculation unit 151 may perform weighting adding in such a manner that weight of a representative point closer to an input position becomes heavier. Then, as an activation score with respect to each application of the user u1 at the input position, the score calculation unit 151 sets an activation score after the addition of each application.

Note that here, at each of the k2 representative points, the score calculation unit 151 may extract a predetermined number of applications with high activation scores and may add, for each application, the activation scores of the extracted applications.

In such a manner, a positional activation prediction model of the user u1 is generated and an activation score with respect to each application at a current position of the user u1 is calculated by utilization of the generated positional activation prediction model. Also, by a similar method, a positional activation prediction model of each user is generated and an activation score with respect to each application at a current position of each user is calculated by utilization of each generated positional activation prediction model. The positional activation prediction model generated for each user is a model on which a tendency of a position at which each application of each user is activated is reflected.

Also, as described above, users are divided into a plurality of groups. Subsequently, a predetermined number of logs are randomly extracted from application use histories of all members in a group and a representative point with respect to the group is set by utilization of the extracted logs according to the above-described method. Note that, for example, in a case where there is a margin in processing time, all logs may be used. Accordingly, the same representative point is set with respect to all members in the group. Also, similarly, a representative point of each group is set.

Also, an activation score with respect to each application at each representative point is calculated according to the above-described method by utilization of application use histories of all members in a group. Accordingly, with respect to all members of the group, the same activation score is set for each application at each representative point. In such a manner, a positional activation prediction model of the group is generated. Also, similarly, a positional activation prediction model of each group is generated. This positional activation prediction model generated for each group becomes a model on which a tendency of a position at which each application of each group (group of similar user) is activated is reflected.

Moreover, by a method similar to the above-described method, the model learning unit 142 generates a positional activation prediction model for all users by using application use histories of all users. This positional activation prediction model becomes a model on which a general tendency of a position of activation of each application is reflected.

Note that, for example, the model learning unit 142 may also set a representative point for each group in a case where a positional activation prediction model is generated for each user. Moreover, for example, the model learning unit 142 may set a common representative point for all users in a case where a positional activation prediction model is generated for each user or each group.

(Third Learning Method of Positional Activation Prediction Model)

Also, for example, the model learning unit 142 can generate a positional activation prediction model based on an access point of Wi-Fi or the like. Here, a case of generating a positional activation prediction model of the user u1 will be described.

For example, on the basis of an application use history of the user u1, the model learning unit 142 tallies the number of times of activation of each application of the user u1 at each access point to which the client 12 is connected in activation of the application. Then, the model learning unit 142 sets, with respect to each application, an activation score corresponding to the number of times of activation at each access point. This model including an activation score with respect to each application at each access point becomes a positional activation prediction model of the user u1. Similarly, a positional activation prediction model of each user is generated.

Moreover, the model learning unit 142 divides users into a plurality of groups as described above. Then, according to a method similar to the above-described method, the model learning unit 142 generates a positional activation prediction model for each group by using application use histories of all members in each group.

Also, according to a method similar to the above-described method, the model learning unit 142 generates a positional activation prediction model for all users by using application use histories of all users.

(First Learning Method of User-State Activation Prediction Model)

Also, there is an application a utilization frequency of which varies greatly depending on a state of a user. Thus, the model learning unit 142 generates an activation prediction model of predicting an activation probability of an application on the basis of a state of a user (hereinafter, referred to as user-state activation prediction model).

Here, a case of generating a user-state activation prediction model with respect to the user u1 will be described.

For example, on the basis of an application use history of the user u1, the model learning unit 142 tallies the number of times of activation of each application for each state of the user u1 in the activation. Then, the model learning unit 142 sets, for each state of the user u1, an activation score corresponding to the number of times of activation with respect to each application. A model including an activation score with respect to each application in each state of this user u1 becomes a user-state activation prediction model of the user u1. Similarly, a user-state activation prediction model of each user is generated. This user-state activation prediction model generated for each user is a model on which a tendency of a state in activation of each application of each user is reflected.

Moreover, the model learning unit 142 divides users into a plurality of groups as described above. Then, by a method similar to the above-described method, the model learning unit 142 generates a user-state activation prediction model for each group by using application use histories of all members in each group. This user-state activation prediction model generated for each group becomes a model on which a tendency of a state in activation of each application of each group (group of similar user) is reflected.

Moreover, for example, according to a method similar to the above-described method, the model learning unit 142 generates a user-state activation prediction model for all users by using application use histories of all users. This user-state activation prediction model is a model on which a general tendency of a state in activation of each application is reflected.

(Second Learning Method of User-State Activation Prediction Model)

Also, for example, the model learning unit 142 can generate a user-state activation prediction model by using a naive Bayes model. Here, a case of generating a user-state activation prediction model with respect to the user u1 by using the naive Bayes model will be described.

On the basis of an application use history of the user u1, the model learning unit 142 calculates an activation probability $p(Y|X)$ of an application Y in a state X of the user u1 by using the following expression (2).

$$p(Y|X)=p(X|Y) \times p(Y)/p(X) \qquad (2)$$

Note that $p(X|Y)$ is a probability that a state of the user u1 is the state X in a case where the application Y is activated. $p(Y)$ is a probability that the user u1 activates the application Y and calculated, for example, according to the number of times of activation of the application Y of the user u1/the number of times of activation of all applications of the user. $p(X)$ is a probability that a state of the user u1 is the state X.

Then, the model learning unit 142 calculates the activation probability $p(Y|X)$ with respect to all combinations of the state X and the application Y. A model including the activation probability $p(Y|X)$ with respect to all combinations of the state X and the application Y is a user-situation activation probability model of the user u1. Similarly, a user-state activation prediction model of each user is generated. This user-state activation prediction model generated for each user is a model on which a tendency of a state in activation of each application of each user is reflected.

Moreover, the model learning unit 142 divides users into a plurality of groups as described above. Then, by a method similar to the above-described method, the model learning unit 142 generates a user-state activation prediction model for each group by using application use histories of all members in each group. This user-state activation prediction model generated for each group becomes a model on which a tendency of a state in activation of each application of each group (group of similar user) is reflected.

Moreover, for example, according to a method similar to the above-described method, the model learning unit 142 generates a user-state activation prediction model for all users by using application use histories of all users. This user-state activation prediction model is a model on which a general tendency of a state in activation of each application is reflected.

(Learning Method of Most-Recent Application Activation Prediction Model)

For example, in applications, there is a combination of applications closely related to each other such as a combination of applications that are often used simultaneously or a combination of applications that are often used successively. For example, there is a combination of an application for creating a document and a dictionary application.

Here, when it is assumed that a state based on a most-recently activated application (hereinafter, referred to as most-recent application state) is a discrete state, it is possible to generate an activation prediction model with a most-recently activated application as an input (hereinafter, most-recent application activation prediction model) according to a method similar to the above-described state activation prediction model.

Note that it is possible to define the most-recent application state only by one series of application that is most recently activated or by n series of applications (n is equal to or larger than 2) from an application that precedes the most-recently activated application for n applications to the most-recently activated application.

For example, in a former case, when there are three applications that are applications A, B, and C, the most-recent application state has three kinds of states in which the applications A, B, and C are respectively activated most recently.

On the other hand, in the latter case, for example, when the most-recent application state is a state based on two series of applications that are activated most recently, there are nine kinds of most-recent application states in total. That is, there are nine kinds in total that include three kinds in a case where each of the applications A, B, and C is activated as an application preceding by one after the application A is activated as an application preceding by two, three kinds in a case where each of the applications A, B, and C is activated as an application preceding by one after the application B is activated as an application preceding by two, and three kinds in a case where each of the applications A, B, and C is activated as an application preceding by one after the application C is activated as an application preceding by two.

Note that the most-recently activated application can be investigated with reference to an application use history of each user.

Note that even when there is a most-recently activated application, it is considered that there is little relationship with an application activated next in a case where power of the client 12 is once turned off therebetween. Also, for example, in a case where there is a long interval between activation of a previous application to activation of a next application, it is considered that there is little relationship between the two applications.

Thus, a condition of employing a most-recently activated application may be limited. For example, it is considered to set limitation to an application that is activated after the power of the client 12 is turned on or to an application that is activated in a predetermined period before current time.

(Integration and Division of Activation Prediction Model)

The above-described activation prediction models can be integrated or divided.

For example, the model learning unit 142 can integrate activation prediction models by generating an activation prediction model by combining a plurality of input parameters. For example, the model learning unit 142 can generate an activation prediction model with a combination of a date and time and an activation position as an input or can generate an activation prediction model with a combination of an activation position and a state of a user as an input.

Also, for example, the model learning unit 142 can generate an activation prediction model by performing division according to a date and time, an activation position, a state of a user, or the like. For example, the model learning unit 142 can divide and generate, for each state of a user, a date-and-time activation prediction model, a positional activation prediction model, and a most-recent application activation prediction model. For example, the model learning unit 142 can generate a date-and-time activation prediction model, a positional activation prediction model, and a most-recent application activation prediction model for each of a case where a user moves and a case where the user does not move.

Also, for example, the model learning unit 142 can generate each of a positional activation prediction model, a user-state activation prediction model, and a most-recent application activation prediction model while performing division according to a period of time or a day in the week.

Moreover, for example, the model learning unit 142 can generate a date-and-time activation prediction model, a user-state activation prediction model, and a most-recent application activation prediction model while performing division according to an activation position. For example, the model learning unit 142 can generate a date-and-time activation prediction model, a user-state activation prediction model, and a most-recent application activation prediction model for each of a case where a user is in a house, a case where the user is in an office, and the other case.

Then, in the above manner, the model learning unit 142 stores information related to a generated activation prediction model into the storage unit 209.

Note that the model learning unit 142 does not necessarily generate all of the above-described activation prediction models and may generate only a part of the activation prediction models. Also, the above-described activation prediction models are examples and an activation prediction model other than the above-described models can be employed.

In step S52, the feature amount vector generation unit 141 generates a feature amount vector of each application (application vector). More specifically, the feature amount vector generation unit 141 generates an application vector of each application on the basis of a distribution of a retaining user. For example, in a case where the total number of users of an activation supporting service is N, a feature amount in a j dimension (however, $0 \leq j \leq N$) of the application vector indicates whether the jth user retains a target application. Then, the feature amount in the j dimension of the application vector is set to 1 in a case where the jth user retains the target application and is set to 0 in a case where the application is not retained.

The feature amount vector generation unit 141 stores a generated application vector of each application into the storage unit 209.

Then, the learning processing is ended.

(Application Activation Supporting Processing)

Figure 9:
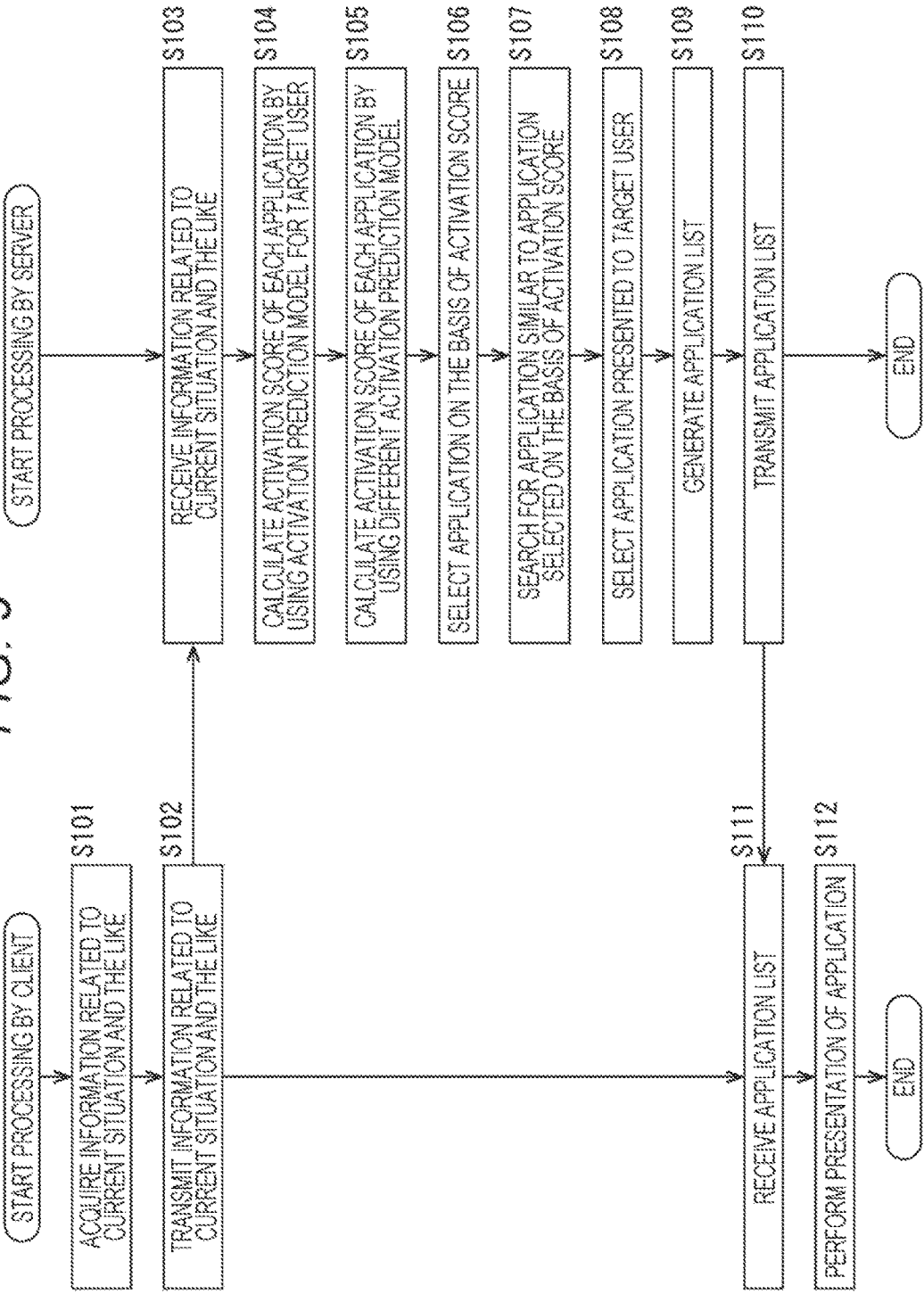
FIG. 9 is a flowchart for describing application activation supporting processing.

Next, application activation supporting processing executed by the information processing system 1 will be described with reference to a flowchart in FIG. 9. Note that in the following, a user who uses the activation supporting service and to whom an application is presented is referred to as a target user in this processing.

In step S101, the information acquisition unit 231 of the client 12 acquires information related to a current situation, or the like. For example, by processing similar to that in step S2 in FIG. 6, the information acquisition unit 231 acquires information indicating a current date and time, a feature of today, a current position of a target user (client 12), a current state of the target user, a current state of surroundings of the user, and the like.

In step S102, the information acquisition unit 231 of the client 12 transmits the information that is related to a current situation and the like and that is acquired in the processing in step S101 to the server 11 through the communication unit 210 and the network 13. Here, the information acquisition unit 231 also transmits a user ID that is one of profiles of the target user in such a manner that the target user can be identified. Note that all profiles of the target user may be transmitted.

In step S103, the information acquisition unit 131 of the server 11 receives, through the communication unit 109, the information that is related to a current situation and the like and that is transmitted from the client 12 in the processing in step S102.

Note that a part of the information indicating a current situation may be acquired by the server 11. For example, the information acquisition unit 131 of the server 11 may acquire information related to a feature of today from a user profile, contact information, schedule information, and the like registered in the server 11 or a different server. Also, for example, the information acquisition unit 131 may acquire information indicating a current date and time from an inner clock in the server 11.

In step S104, the score calculation unit 151 of the server 11 calculates an activation score of each application by using an activation prediction model for the target user. More specifically, on the basis of the user ID of the target user, the score calculation unit 151 reads, from the storage unit 108, information related to an activation prediction model generated only for the target user. Then, the score calculation unit 151 calculates an activation score of each application by inputting a current situation (such as date and time, position, and state of user) into the read activation prediction model.

Here, the score calculation unit 151 does not necessarily use all activation prediction models for the target user and may select a used activation prediction model. Also, in a case of using a plurality of activation prediction models, the score calculation unit 151 adds, for each application, activation scores calculated by utilization of each activation prediction model. Accordingly, a plurality of activation prediction models is substantially integrated.

Also, in a case of adding activation scores by each activation prediction model, the score calculation unit 151 may perform adding while giving weight to each activation prediction model. This weight is set, for example, on the basis of accuracy or a degree of influence of each activation prediction model. For example, weight is set to a larger value as accuracy of an activation prediction model becomes higher. Note that the weight may be a fixed value or may vary according to a situation.

Note that in the following, an activation score calculated on the basis of an activation prediction model for a target user is referred to as an activation score for a target user.

In step S105, the score calculation unit 151 of the server 11 calculates an activation score of each application by using a different activation prediction model. For example, the score calculation unit 151 reads, from the storage unit 108, information related to an activation prediction model generated with a group, to which a target user belongs, as a target. Then, the score calculation unit 151 calculates an activation score of each application by inputting a current situation (such as date and time, position, and state of user) into the read activation prediction model.

Here, the score calculation unit 151 does not necessarily use all activation prediction models for the group, to which the target user belongs, and may select a used activation prediction model. Also, similarly to the processing in step S104, in a case of using a plurality of activation prediction models, the score calculation unit 151 adds, for each application, activation scores calculated by utilization of each activation prediction model.

Note that in the following, an activation score calculated on the basis of an activation prediction model for a group to which a target user belongs is referred to as an activation score for a group.

Also, for example, the score calculation unit 151 reads, from the storage unit 108, information related to an activation prediction model generated with all users as targets. Then, the score calculation unit 151 calculates an activation score of each application by inputting a current situation (such as date and time, position, and state of user) into the read activation prediction model.

Here, the score calculation unit 151 does not necessarily use all activation prediction models for all users and may select a used activation prediction model. Also, similarly to the processing in step S104, in a case of using a plurality of activation prediction models, the score calculation unit 151 adds, for each application, activation scores calculated by utilization of each activation prediction model.

Note that in the following, an activation score calculated on the basis of an activation prediction model for all users is referred to as an activation score for all users.

In step S106, the presented application selection unit 153 of the server 11 selects an application on the basis of an activation score. More specifically, the presented application selection unit 153 adds, for each application, an activation score for a target user, an activation score for a group, and an activation score for all users.

Here, the presented application selection unit 153 may perform weighting adding. For example, when weight with respect to the activation score for a target user is increased, an activation score with respect to an application that is often used by the target user in a current situation is increased. Also, for example, when weight with respect to the activation score for a group is increased, an activation score with respect to an application that is often used by members in a group, to which the target user belongs, in a current situation is increased. Moreover, for example, when weight with respect to the activation score for all users is increased, an activation score with respect to an application that is often used generally in a current situation is increased.

Then, on the basis of an activation score after the addition, the presented application selection unit 153 selects a candidate of an application to be presented to a user (hereinafter, referred to as score selection application). For example, the presented application selection unit 153 selects, as score selection applications, a predetermined number of applications in descending order of an activation score after the addition. Also, for example, the presented application selection unit 153 selects, as a score selection application, an application with an activation score after the addition being equal to or larger than a predetermined threshold.

In step S107, the similar application searching unit 152 of the server 11 selects an application similar to an application selected on the basis of an activation score. More specifically, the similar application searching unit 152 reads an application vector of each application from the storage unit 108. Then, by using the Jaccard coefficient or the like, the similar application searching unit 152 calculates a degree of similarity between an application vector of each score selection application and an application vector of each application other than the score selection application.

Then, on the basis of the calculated degree of similarity, the similar application searching unit 152 selects a candidate of an application to be presented to a user (hereinafter, referred to as similar application) from applications other than the score selection application. For example, the similar application searching unit 152 selects, as similar applications, a predetermined number of applications in descending order of a degree of similarity. Also, for example, the similar application searching unit 152 selects, as a similar application, an application with a degree of similarity being equal to or higher than a predetermined threshold. Accordingly, an application with a distribution of a retaining user being similar to that of each score selection application is selected as a similar application.

In step S108, the presented application selection unit 153 of the server 11 selects an application to be presented to the target user (presented application). More specifically, the presented application selection unit 153 selects, as presented applications, a predetermined number of applications from score selection applications and similar applications.

Note that a method of selecting the presented applications from the score selection applications and the similar applications can be set to an arbitrary method. For example, in a case where the number of presented applications is n, when there are more than n score selection applications, the presented application selection unit 153 selects, n score selection applications are selected as the presented applications in descending order of a presentation score. On the other hand, in a case where there are less than n score selection applications, for example, the presented application selection unit 153 selects all score selection applications as the presented applications and selects a presented application in short from the similar applications in descending order of a degree of similarity.

Note that even when there are more than n score selection applications, the presented application selection unit 153 may select a presented application from the similar applications. Also, for example, the presented application selection unit 153 may exclude an application, which is not retained by the target user, from a candidate and may select a presented application only from applications retained by the target user.

Also, in a case of selecting a presented application from applications that are not retained by the target user, for example, when there is an application that is set to be recommended preferentially because of a promotion or the like, the presented application selection unit 153 preferentially selects the application as a presented application.

Also, the presented application selection unit 153 sets order of priority of a selected presented application on the basis of an activation score and a degree of similarity. For example, the presented application selection unit 153 sets, as order of priority, order in which score selection applications among presented applications are arranged in descending order of an activation score and similar applications are successively arranged in descending order of a degree of similarity.

Note that, for example, the presented application selection unit 153 may set order of priority of an application that is retained by the target user to be higher than that of an application that is not retained by the target user. Also, for example, when there is an application that is set to be recommended preferentially among presented applications, the presented application selection unit 153 may set order of priority of the application to be high.

In such a manner, a presented application is selected on the basis of a score calculated by utilization of an activation prediction model for a target user which model is generated on the basis of an application use history of the target user. Accordingly, a presented application is substantially selected on the basis of the application use history of the target user.

Also, a presented application is selected on the basis of a score calculated by utilization of an activation prediction model generated on the basis of an application use history of a user different from the target user (activation prediction model for group and activation prediction model for all user). Accordingly, a presented application is substantially selected on the basis of an application use history of a different user.

In step S109, the application list generation unit 162 of the server 11 generates an application list. More specifically, the application list generation unit 162 generates an application list that includes information related to each presented application, and order of priority.

In step S110, the application list generation unit 162 of the server 11 transmits an application list. That is, the application list generation unit 162 transmits the generated application list to the client 12 of the target user through the communication unit 109 and the network 13.

Then, the processing by the server 11 is ended.

In step S111, the CPU 201 of the client 12 receives, through the communication unit 210, the application list transmitted from the server 11.

In step S112, the client 12 presents an application. For example, the display control unit 241 of the client 12 displays a screen to present a presented application on a display included in the output unit 207.

Here, with reference to FIG. 10 to FIG. 14, an example of a method of presenting a presented application on a screen 311 of a smartphone 301 in a case where the client 12 includes the smartphone 301 will be described. Note that the screen 311 includes a touch panel. Also, a number illustrated on each icon in FIG. 10 to FIG. 14 indicates order of priority of a presented application. For example, an icon on which a number 1 is illustrated is an icon indicating a presented application with first priority. Note that an image or the like indicating a corresponding presented application is actually displayed on each icon.

Figure 10:
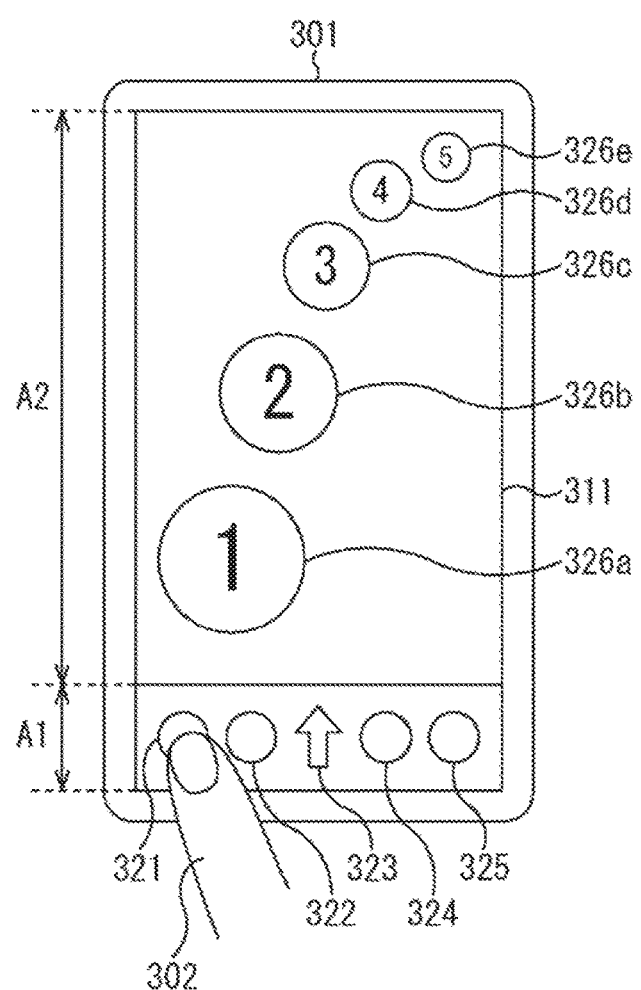
FIG. 10 is a view illustrating a first example of a presenting method of an application.

In FIG. 10, a first example of a presenting method of a presented application is illustrated. In this example, the screen 311 of the smartphone 301 is roughly divided into an area A1 and an area A2. In the area A1 at a lower end of the screen 311, a button 321 to a button 325 to operate the smartphone 301 are displayed in a row. Then, when the target user touches the button 321 with a finger 302 (perform predetermined operation on button 321), icons 326a to 326e indicating presented applications are displayed in the area A2 above the area A1. Note that in the following, the icons 326a to 326e will be simply referred to as an icon 326 in a case where individual distinction is not necessary.

The icons 326 are arranged substantially in an arc shape from the lower left to upper right in the area A2 in order of the icon 326a, the icon 326b, the icon 326c, the icon 326d, and the icon 326e from a side close to the button 321 operated by the target user. That is, an icon 326 of a presented application with high priority is displayed close to the button 321 and an icon 326 of a presented application with low priority is displayed at a position far from the button 321.

Also, sizes of the icons 326 are in order of the icon 326a, the icon 326b, the icon 326c, the icon 326d, and the icon 326e. That is, an icon 326 of a presented application with high priority is large and an icon 326 of a presented application with low priority is small.

Then, in a case where the target user slides the finger 302 on the screen 311 while touching the screen 311 and releases the finger on an intended icon 326 from the screen 311, a presented application corresponding to the icon 326 is selected. Then, the execution control unit 242 activates the selected presented application. Here, since an icon 326 of a presented application with high priority is displayed in a large size near the button 321, it becomes easy for the target user to select a presented application with high priority.

On the other hand, when the target user releases the finger 302 from the screen at a position other than each icon 326, selection of a presented application is canceled. Then, each icon 326 disappears from the screen 311 and no presented application is activated.

Figure 11:
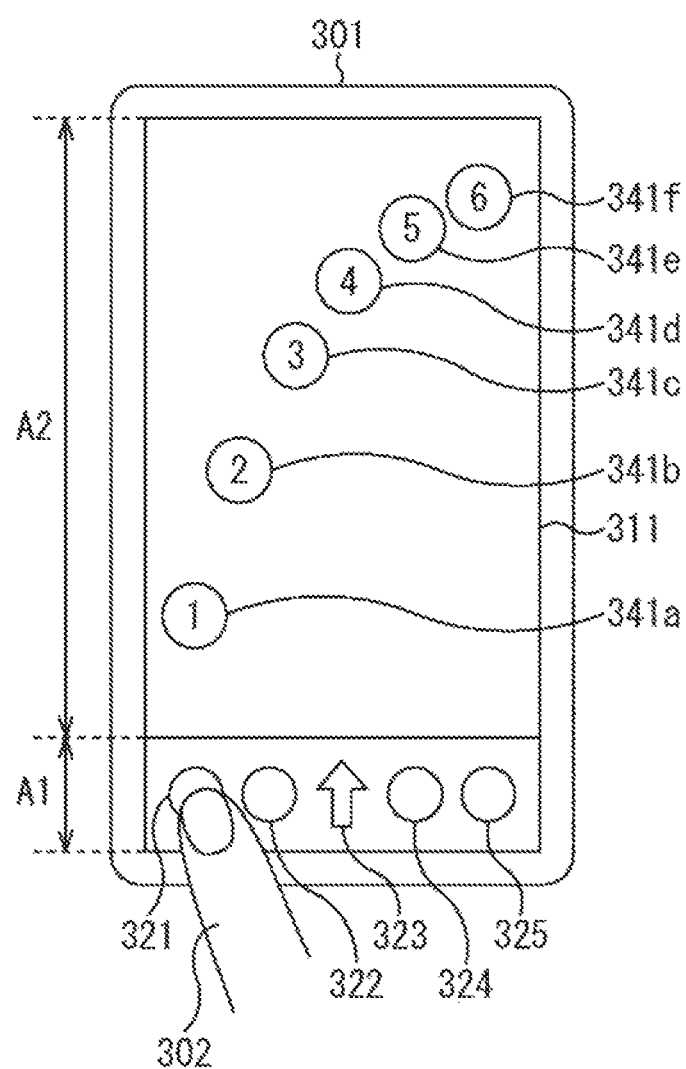
FIG. 11 is a view illustrating a second example of a presenting method of an application.

In FIG. 11, a second example of a presenting method of a presented application is illustrated. In this example, similarly to the example in FIG. 10, a screen 311 of a smartphone 301 is divided to an area A1 and an area A2, and a button 321 to a button 325 are arranged in the area A1. Then, when the target user touches the button 321 with the finger 302 (perform predetermined operation on button 321), icons 341a to 341f indicating presented applications are displayed in the area A2. Note that in the following, the icons 341a to 341f will be simply referred to as an icon 341 in a case where individual distinction is not necessary.

The icons 341 are arranged substantially in an arc shape from the lower left to the upper right in the area A2 in order of the icon 341a, the icon 341b, the icon 341c, the icon 341d, the icon 341e, and the icon 341f from a side close to the button 321 operated by the target user. That is, an icon 341 of a presented application with high priority is displayed close to the button 321 and an icon 341 of a presented application with low priority is displayed at a position far from the button 321. Also, a distance between an icon 341 of a presented application with high priority and an adjoining icon 341 is long and a distance between an icon 341 of a presented application with low priority and an adjoining icon 341 is short.

Then, in a case where the target user slides the finger 302 on the screen 311 while touching the screen 311 and releases the finger on an intended icon 341 from the screen 311, a presented application corresponding to the icon 341 is selected. Then, the execution control unit 242 activates the selected presented application. Here, since an icon 341 of a presented application with high priority is displayed near the button 302 and has a long distance to an adjoining icon 341, it becomes easy for the target user to select a presented application with high priority.

On the other hand, when the target user releases the finger 302 from the screen at a position other than each icon 341, selection of the presented application is canceled. Then, each icon 341 disappears from the screen 311 and no presented application is activated.

Figure 12:
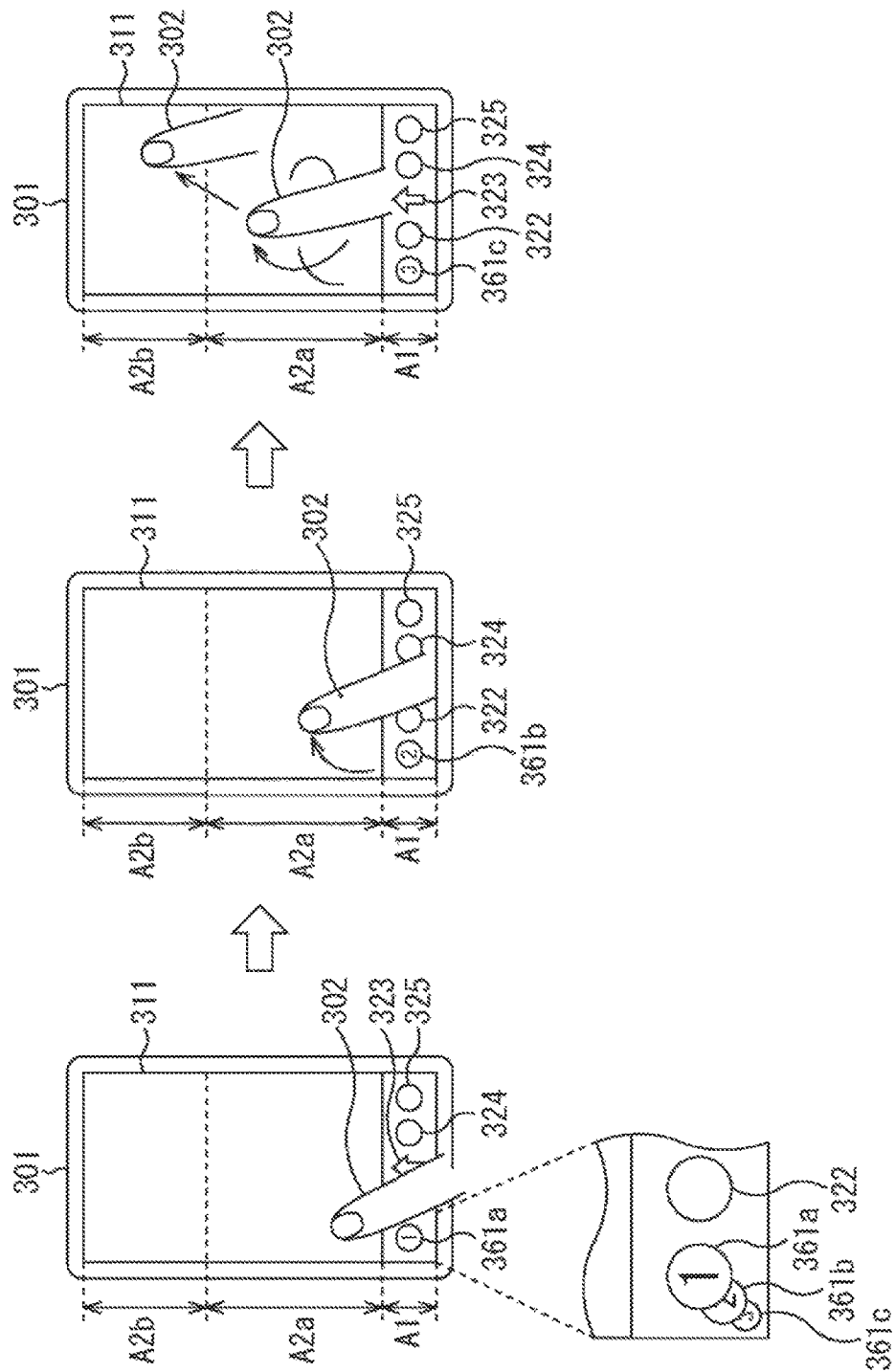
FIG. 12 is a view illustrating a third example of a presenting method of an application.

In FIG. 12, a third example of a presenting method of a presented application is illustrated. In this example, similarly to the example in FIG. 10, a screen 311 of a smartphone 301 is roughly divided into an area A1 and an area A2. Moreover, the area A2 is divided into an area A2a and an area A2b. Note that a dotted line in a horizontal direction on the screen 311 in FIG. 12 is an auxiliary line and is not actually displayed.

Similarly to the example in FIG. 10, buttons 321 to 325 are arranged in the area A1 (however, button 321 is not illustrated in FIG. 12). Then, when the target user slides the finger 302 to the area A2a above the area A1 after touching the button 321 with the finger 302, icons 361a to 361c are displayed in a region of the button 321. More specifically, as illustrated in a drawing at a left end in FIG. 12, the icons 361a to 361c are displayed in an overlapped manner from a top in order of the icon 361a, the icon 361b, and the icon 361c. Also, a size of the icon 361a on the frontmost side is the largest and a size of the icon 361c on the rearmost side is the smallest. Note that in the following, the icons 361a, 361b, 361c . . . will be simply referred to as an icon 361 in a case where individual distinction is not necessary.

Then, when the target user slides the finger 302 in the area A2a, an icon 361 displayed on the frontmost side in the area A1 is switched in response to a moving distance of a position specified with the finger 302 in accordance with order of priority of a presented application. For example, when the finger 302 is slid for a predetermined distance in the area A2a from a state illustrated in the drawing at the left end in FIG. 12, the icon 361b is displayed on the frontmost side in the area A1 as illustrated at a center in FIG. 12. Also, although it is not illustrated, similarly to the drawing at the left end, the icons 361c and 361d are displayed in an overlapped manner on a rear surface of the icon 361b. Note that the icon 361d is an icon indicating a presented application with fourth priority.

Also, for example, when the finger 302 is slid for a predetermined distance in the area A2a from a state illustrated in the drawing at the center in FIG. 12, the icon 361c is displayed on the frontmost side in the area A1 as illustrated at a right end in FIG. 12. Also, although it is not illustrated, similarly to the drawing at the left end, the icons 361d and 361e are displayed in an overlapped manner on a rear surface of the icon 361c. Note that the icon 361e is an icon indicating a presented application with fifth priority.

Then, by releasing the finger 302 in the area A2a from the screen 311, the target user can select a presented application corresponding to an icon 361 displayed on the frontmost side in the area A1 at that time. Then, the execution control unit 242 activates the selected presented application.

Note that a direction of sliding the finger 302 in the area A2 is not specifically limited and an icon 361 displayed on the frontmost side in the area A1 is switched only on the basis of a distance of sliding the finger 302 (moving distance).

Here, a moving distance of the finger 302 which distance is necessary for switching a display of the icon 361 is adjusted according to order of priority. More specifically, with respect to an icon 361 of a presented application with high priority, a moving distance of the finger 302 which distance is necessary for switching a display to a next icon 361 (until next icon 361 is displayed on frontmost side) is set to be long. On the other hand, with respect to an icon 361 of a presented application with low priority, a moving distance of the finger 302 which distance is necessary for switching a display to a next icon 361 (until next icon 361 is displayed on frontmost side) is set to be short. For example, a moving distance of the finger 302 which distance is necessary in a case of switching the icon 361a on the frontmost side in the area A1 to the icon 361b becomes longer than that in a case of switching the icon 361b to the icon 361c.

Thus, an icon 361 of a presented application with high priority is displayed on the screen 311 for a long period and it becomes easy for the target user to select a presented application with high priority. Also, since an icon 361 of a presented application with low priority is displayed on the screen 311 for a short period, the target user can quickly display and select an icon 361 with low priority on the screen 311.

On the other hand, when the target user slides the finger 302 to the area A2b above the area A2a and releases the finger from the screen 311, selection of a presented application is canceled. Then, each icon 361 disappears from the screen 311, the button 321 is displayed again, and no presented application is activated.

Figure 13:
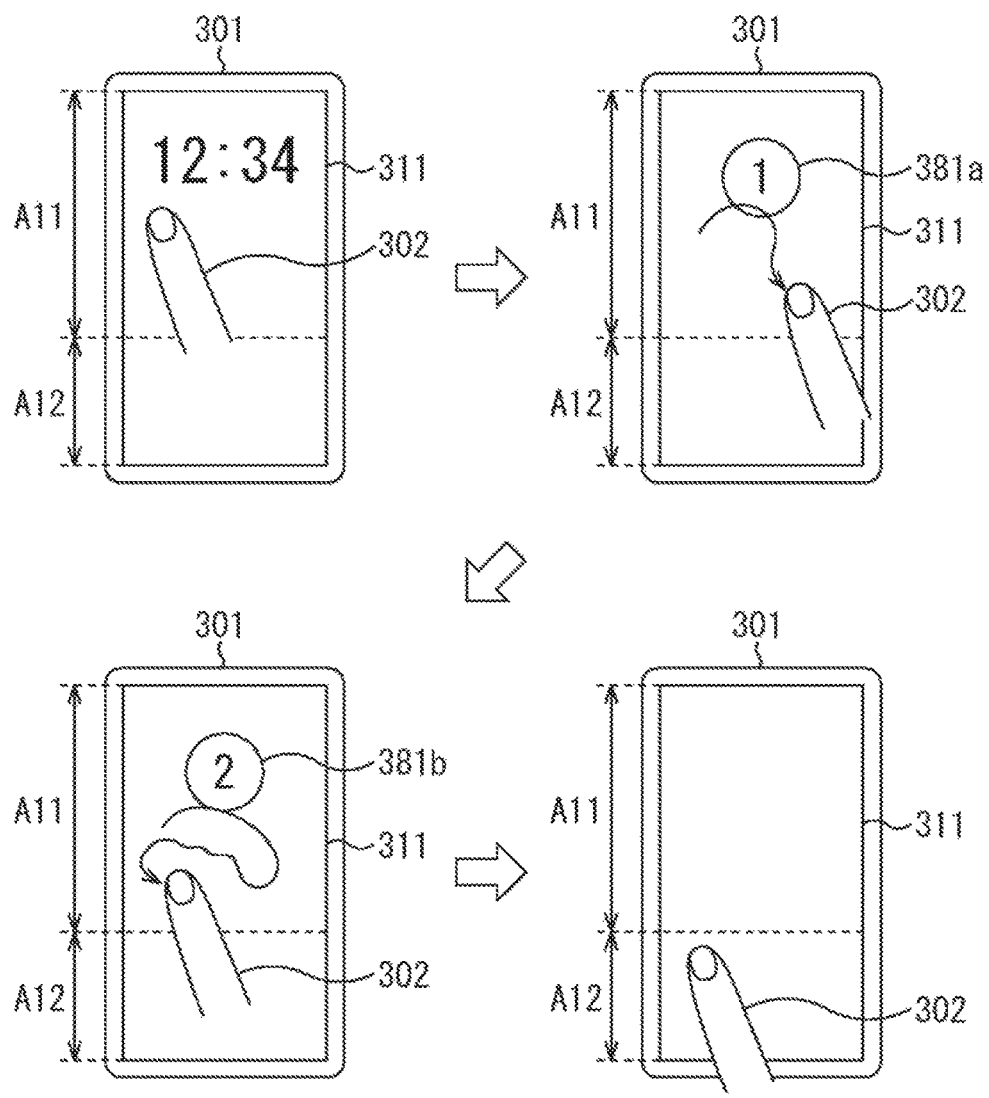
FIG. 13 is a view illustrating a fourth example of a presenting method of an application.

In FIG. 13, a fourth example of a presenting method of a presented application is illustrated. In this example, a lock screen on which user operation is limited is displayed on a screen 311 of a smartphone 301. Note that a dotted line in a horizontal direction on the screen 311 in FIG. 13 is an auxiliary line and is not actually displayed.

For example, when the target user touches an area A11 that is from an upper end to a position slightly below the middle of the screen 311 with the finger 302 and slides the finger 302 for a predetermined distance in the area A11, an icon 381a is displayed in the area A11 as illustrated in an upper right drawing in FIG. 13. Moreover, when the target user slides the finger 302 for a predetermined distance in the area A11, an icon 381b is displayed in the area A11 as illustrated in a lower left drawing in FIG. 13. Note that in the following, the icons 381a, 381b . . . will be simply referred to as an icon 381 in a case where individual distinction is not necessary.

In such a manner, when the target user slides the finger 302 in the area A11, an icon 381 displayed in the area A11 is switched according to order of priority of a presented application. Then, by releasing the finger 302 in the area A11 from the screen 311, the target user can select a presented application corresponding to an icon 381 displayed in the area A11 at that time. Then, the execution control unit 242 releases the lock screen (limitation in user operation) and activates the selected presented application.

Note that a direction of sliding the finger 302 in the area A11 is not specifically limited. An icon 381 displayed in the area A11 is switched only on the basis of a distance of sliding of the finger 302 (moving distance of position specified with finger 302).

Here, a moving distance of the finger 302 which distance is necessary for switching a display of the icon 381 is adjusted according to order of priority. More specifically, a moving distance of the finger 302 which distance is necessary for switching a display of an icon 381 of a presented application with high priority to a next icon 381 becomes long. On the other hand, a moving distance of the finger 302 which distance is necessary for switching a display of an icon 381 of a presented application with low priority to a next icon 381 becomes short. For example, a moving distance of the finger 302 which distance is necessary in a case of switching an icon 361a in the area A11 to an icon 361b becomes longer than that in a case of switching the icon 361b to an icon 361c.

Thus, an icon 381 of a presented application with high priority is displayed on the screen 311 for a long period and it becomes easy for the target user to select a presented application with high priority. Also, since an icon 381 of a presented application with low priority is displayed on the screen 311 for a short period, the target user can quickly display and select an icon 381 with low priority on the screen 311. Also, since a selected presented application is activated at releasing of a lock screen, the target user can use an intended application more quickly and easily.

On the other hand, when the target user slides the finger 302 to an area A12 below the area A11 and releases the finger from the screen 311, selection of a presented application is canceled. That is, in this case, no presented application is activated. Then, the execution control unit 242 releases the lock screen (limitation in user operation) and the display control unit 241 displays a normal screen (such as launcher screen) displayed after releasing of a lock.

Figure 14:
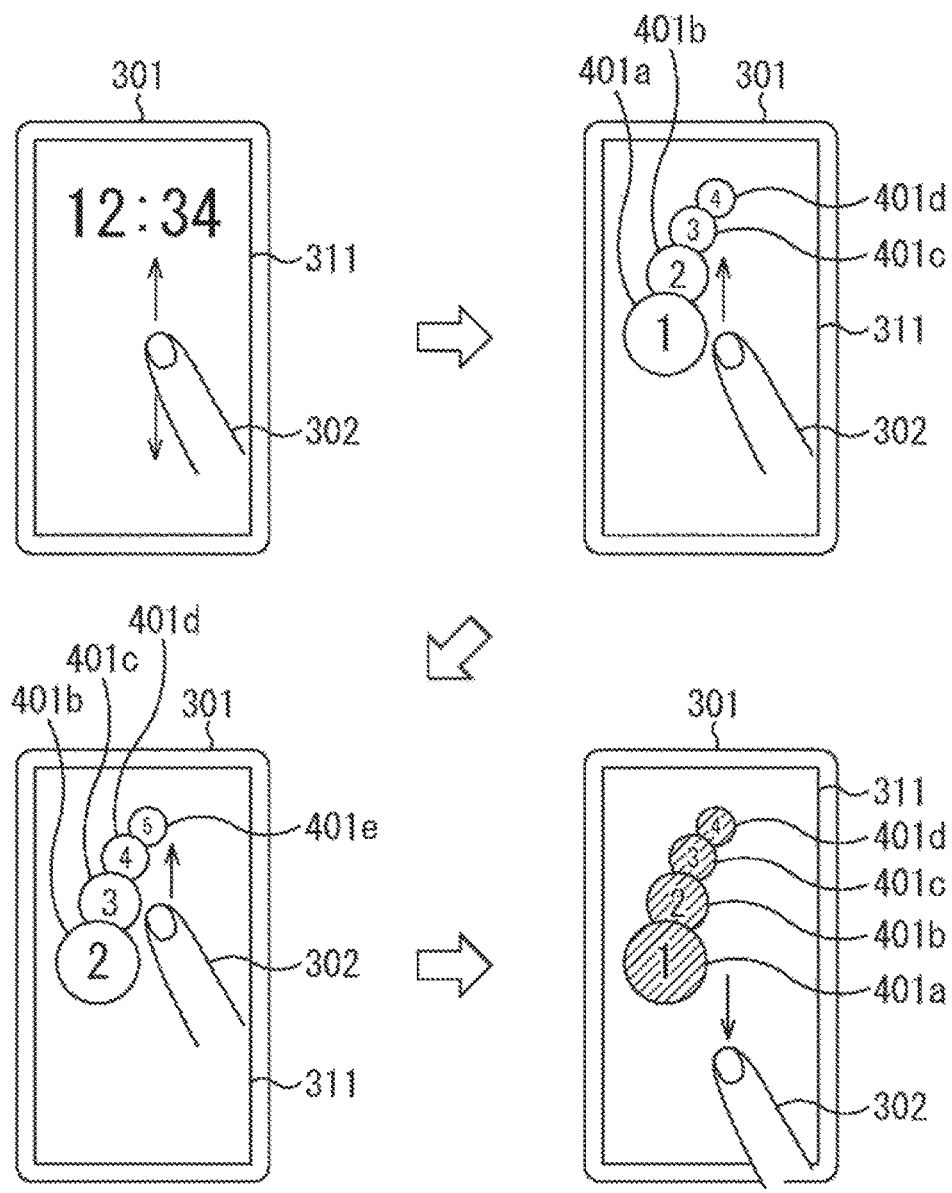
FIG. 14 is a view illustrating a fifth example of a presenting method of an application.

In FIG. 14, a fifth example of a presenting method of a presented application is illustrated. In this example, a lock screen is displayed on a screen 311 of a smartphone 301.

This lock screen is released, for example, by sliding of the finger 302 in a longitudinal direction on the screen 311.

Then, for example, when the target user touches the screen 311 with the finger 302 and slides the finger 302 in an upward direction, icons 401a to 401d are displayed in an overlapped manner in a slight-diagonal and longitudinal direction substantially from a middle at a left end of the screen 311 as illustrated in an upper right drawing in FIG. 14. Also, the icon 401a is displayed on a lowermost and frontmost side and the icon 401d is displayed on an uppermost and rearmost side. Also, sizes of the icons 401a to 401d become large in the front and become small in the rear. Note that in the following, the icons 401a, 401b, 401c . . . will be simply referred to as an icon 401 in a case where individual distinction is not necessary.

Moreover, when the target user slides the finger 302 in an upward direction, a region of an icon 401 displayed on the screen 311 is slid in a front direction according to order of priority as illustrated in the lower left in the drawing. That is, the icon 401a on the frontmost side disappears, the icon 401b moves to the frontmost side, and the icon 401d appears on the rearmost side.

Note that although it is not illustrated, a region of an icon 401 displayed on the screen 311 is slid in a front direction according to order of priority when the target user further slides the finger 302 in the upward direction. That is, an icon 401 displayed on the screen 311 is switched according to order of priority of a presented application and an icon 401 displayed on the frontmost side is switched according to the order of priority of the presented application.

On the other hand, when the target user slides the finger 302 in a downward direction, a region of an icon 401 displayed on the screen 311 is slid in a rear direction according to opposite order of priority. That is, an icon 401 displayed on the screen 311 is switched according to opposite order of priority of a presented application and an icon 401 displayed on the frontmost side is switched according to the opposite order of priority of the presented application.

Then, by releasing the finger 302 from the screen 311, the target user can select a presented application corresponding to an icon 401 displayed on the frontmost side in the screen 311 at that time. Then, the execution control unit 242 releases the lock screen (limitation in user operation) and activates the selected presented application.

Thus, since an icon 401 of a presented application with high priority is quickly displayed on the screen 311, it becomes easy for the target user to select a presented application with high priority. Also, since the target user can switch an icon 401 displayed on the screen 311 in both of a forward direction (order of priority) and in an opposite direction (opposite order of priority), it becomes easy to select an intended application. Also, since a selected presented application is activated at releasing of a lock screen, the target user can use an intended application more quickly and easily.

On the other hand, in a state in which the icon 401a is displayed on the frontmost side, gray-out of the icons 401a to 401d is performed when the finger 302 is slid for a predetermined distance in the downward direction as illustrated in a lower right screen in FIG. 14. In this state, when the target user releases the finger 302 from the screen 311, selection of a presented application is canceled. That is, in this case, no presented application is activated. Then, the execution control unit 242 releases the lock screen (limitation in user operation) and the display control unit 241 displays a normal screen (such as launcher screen) displayed after releasing of a lock.

Note that as described above, the server 11 can select, as a presented application, an application that is not retained by the target user (such as application that is not installed in smartphone 301). Then, for example, in a case of presenting a presented application that is not retained by the target user, the display control unit 241 may perform a display while distinguishing a color, a shape, or the like of an icon thereof from that of a presented application retained by the target user.

Also, when a presented application that is not retained by the target user is selected, for example, the execution control unit 242 performs control in such a manner that a web page where the presented application can be acquired is accessed and displayed on the screen 311. Accordingly, it becomes possible for the target user to quickly acquire and use an intended application.

Moreover, for example, a plurality of presented applications may be selected and activated simultaneously.

Then, the processing by the client 12 is ended.

In the above manner, an appropriate application is selected according to a current situation and is presented to the target user. Accordingly, the target user can use an intended application quickly and easily and convenience is improved.

Also, since a presented application is selected on the basis not only of an application use history of the target user but also of an application use history of a different user, an appropriate application is presented, for example, even in a situation that is not yet experienced by the target user. Moreover, by selecting a presented application by utilization of an activation prediction model for a group to which a user similar to the target user belongs, it becomes possible to present a more appropriate application.

Also, when a presented application is selected on the basis of an application use history of a different user or a presented application is selected from similar applications, there is a case where an application that is not retained by the target user is presented. Accordingly, the target user can know a new application suitable for a current situation and can acquire the application when necessary.

Also, as described above, by generating a date-and-time prediction model by utilization of a periodic function and treating time information as a continuous value, it is possible to calculate an activation score more accurately compared to a case where time information is divided according to a period of time or a day in the week and is treated in a discretized manner. As a result, an application with a higher probability of being used by the target user can be presented.

Moreover, as described above, by setting density of representative points according to density of previous activation positions of an application and generating a positional activation prediction model, it is possible to calculate an activation score more accurately compared to a case where a position prediction model is generated on the basis of a fixed area. As a result, an application with a higher probability of being used by the target user can be presented.

Here, with reference to FIG. 15, a detailed example of an application presented to a user will be described.

In FIG. 15, a history of an application that is previously used by a user in each situation is illustrated. More specifically, in a chart in FIG. 15, a situation is classified by three elements that are a date and time, a place (position), and action of a user. The date and time is classified into two kinds that are a weekday (Monday to Friday) and a weekend (Saturday and Sunday) and each of the weekday and the weekend is classified into three kinds that are the morning, the daytime, and the night. The place is classified into four kinds that are a house, an outside, an office, and an unknown place. Here, the unknown place is a place that is not in an application use history of the user. The action of the user is classified into two kinds that are a moving state and non-moving state. Here, the moving state is a state in which the user is moving from a place, for example, in a case of walking, running, driving, or riding on a vehicle. The non-moving state is a state in which a user is not moving from a place, for example, in a case of sitting, sleeping, or the like.

Then, in each section in the chart, an application that is previously activated by the user in each situation is indicated. For example, applications that are previously activated by the user in a situation of moving in a house in the daytime in a weekend are applications of a transfer guide and a map. Also, for example, an application that is previously activated by the user in a moving situation in the outside in the morning in a weekday is an application of news. Moreover, for example, an application that is previously activated by the user in a non-moving situation in an office in the night in the weekday is a browser.

In a case where an application is presented to the user by utilization of the above-described activation supporting service, in a situation in which there is a log of a previous application use history of the user, an application recorded in the log is likely to be presented. For example, in a case where a current situation is a situation in which the user moves in the house in the morning in the weekday, the application of news is likely to be presented.

On the other hand, a situation in which *1 is illustrated in a section is a situation in which there is no log of a previous application use history of the user. However, according to the above-described activation supporting service, an appropriate application is presented to the user by utilization of a previous log in a situation close to a current situation even in the case where the current situation is a situation with no previous log.

For example, in a case where a current situation is a situation in which the user moves in the house in the night in the weekday, there is no previous log in the current situation. However, for example, there is a previous log in each of the situation in which the user moves in the office in the night in the weekday (hereinafter, referred to as situation 1), the situation in which the user moves in the house in the morning in the weekday (hereinafter, referred to as situation 2), and the situation in which the user does not move in the house in the night in the weekday (hereinafter, referred to as situation 3), these situations being close to the current situation. Thus, for example, all or a part of applications of a mail in the previous log in the situation 1, news in the previous long in the situation 2, and a clock in the previous log in the situation 3 is likely to be presented to the user. Also, it is predicted that a presented application has a high probability of being used by the user since the presented application is an application that is previously activated by the user in a situation close to the current situation.

Also, a situation in which *2 is illustrated in a section is a situation in an unknown place that is not in an application use history of the user (such as place visited by user for first time) and there is no previous log. However, for example, even when the user is currently in an unknown place, an appropriate application is presented to the user, for example, by utilization of a previous log in a situation with a condition other than a place being identical or similar.

Alternatively, as described above, since a presented application is selected by utilization of an activation prediction model generated by utilization of an application use history of a different user, an appropriate application is presented to the user on the basis of a log of the use history of the different user in a current situation of the user. In this case, by utilization of an activation prediction model generated by utilization of an application use history of a group of users similar to the user, a more appropriate application is presented to the user. Also, by subdivision of a group of similar users by a demographic, a further appropriate application is presented to the user.

For example, an example of subdividing a group of similar users by nationality will be considered. For example, in a case where a Japanese user visits Hawaii for the first time for sightseeing, an application that is often used by a local similar user may be presented when a group of similar users is not subdivided by nationality. In this case, an application used by a local user is likely to be unnecessary for a user on a sightseeing trip. On the other hand, in a case where a group of similar users is subdivided by nationality, an application that is often used by a similar Japanese user in Hawaii (such as application that is often used by Japanese tourist in Hawaii) is presented. This application is likely to be useful for a user.

By subdivision of a group of similar users by a demographic in such a manner, a more appropriate application is presented to the user.

Also, for example, by using the above-described positional activation prediction model, the server 11 can present an appropriate application to the user on the basis of an activation score of each application at each representative point (house and office) and a distance to each representative point even when the user is in an unknown place.

Moreover, for example, by performing learning of an activation prediction model by utilization of a distance to a registered place (such as house and office) as a feature amount and using the generated activation prediction model, the server 11 can present an appropriate application to the user on the basis of a distance between an unknown place and the registered place. Also, for example, the server 11 can treat this distance as discretized data. Moreover, for example, on the basis of this distance, the server 11 can determine whether the user is out or not, or is in a home country or in a foreign country.

Also, for example, by generating an activation prediction model with a general label that is assigned to each place (such as tourist site, mountain, or restaurant) as a feature amount, the server 11 can present an appropriate application on the basis of a label assigned to an unknown place.

2. Modification Example

In the following, a modification example of the above-described embodiment of the present technology will be described.

{Modification Example Related to Selection Method of Presented Application}

In the above description, an example in which the server 11 selects a presented application by using activation prediction models for a target user, a group, and all users has been described but a presented application may be selected by utilization of any one or two thereof. For example, a server 11 can select a presented application only by using an activation prediction model for a target user or can select a presented application only by using activation prediction models for a target user and for a group.

Also, the server 11 can select a presented application by using an activation prediction model for a group to which a target user does not belong (such as group to which user who is not similar to target user belong).

Moreover, the server 11 can select a similar application on the basis of a degree of similarity that is different from a degree of similarity in a distribution of retaining users. For example, the server 11 can select a similar application on the basis of a degree of similarity in a feature amount based on metadata or the like of an application. Also, the server 11 can select a similar application by combining a plurality of kinds of degree of similarity.

{Modification Example Related to Presenting Method of Application}

A method of presenting a presented application to a target user is not limited to the above-described example and an arbitrary method can be employed.

For example, an execution control unit 242 of a client 12 may present a presented application to a target user by automatically bringing one or more presented applications into a usable state regardless of a user operation. For example, the execution control unit 242 may automatically activate a presented application when receiving an application list from a server 11. Also, for example, in a case where a presented application operates in a background when an application list is received from the server 11, the execution control unit 242 may automatically operate the presented application in a foreground.

Note that in this case, an activated application that is activated automatically or operated automatically in the foreground may be only a part of activated applications included in the application list. Also, for example, in a case where the presented application that is automatically activated or automatically operated in the foreground is not included in an application list in and after next reception, the execution control unit 242 may automatically end execution of the presented application or may automatically operate the presented application in the background.

Moreover, for example, the execution control unit 242 may automatically execute a presented application in a background of a lock screen when receiving an application list from the server 11. Accordingly, when the lock screen is released, the presented application is brought into a state usable in a foreground and a target user can quickly use the presented application.

Moreover, for example, by automatically executing an application which does not specifically require operation and a purpose of which is accomplished only by looking (such as application of weather forecast) and displaying the application on a lock screen, the execution control unit 242 may perform presentation to a user.

Also, for example, a presenting method of an application, or a presented application may be changed according to a kind of the client 12. For example, the presentation control unit 232 of the client 12 may preferentially present a presented application with low power consumption in a case where the client 12 is operated by a battery. Also, for example, the presentation control unit 232 may select a presented application to be presented according to a specification or a capacity of the client 12 (such as processing capacity of processor or size of display).

Moreover, for example, the presentation control unit 232 may select a presented application to be presented according to a specification or a function of the client 12. For example, in a case where the client 12 includes a wearable device, the presentation control unit 232 may select a presented application to be presented according to a specification or a function of the wearable device.

Also, for example, in a case where a target user includes a plurality of clients 12, the clients 12 may present a presented application to the target user in cooperation. Here, an example in a case where the target user has a mobile information terminal such as a smartphone, and a wearable device will be described.

For example, in a case where a presented application is executed in the wearable device, when a lock screen of the mobile information terminal is released, the mobile information terminal may activate a presented application identical with that in the wearable device and may present, with the activated presented application, detailed information compared to that on the wearable device.

For example, in a case where an application of a weather forecast is selected by the server 11, the wearable device immediately executes the application of a weather forecast and only displays today's weather at a current position. On the other hand, when the lock screen is released, the mobile information terminal activates the application of a weather forecast and displays a weather forecast in more detail. For example, the mobile information terminal displays weather in each three hours at a current position, a weekly weather forecast, temperature, a weather forecast of a surrounding area, and the like. Accordingly, the target user can acquire necessary information only with a wearable terminal and can acquire information in more detail with the mobile information terminal.

Also, for example, in a case where a target user is at a photography spot such as a tourist site, when an application of a camera is selected by the server 11, the wearable device displays a picture taken in a current place provided by the server 11 along with an icon indicating the application of a camera. On the other hand, the mobile information terminal activates the application of a camera when the lock screen is released. Accordingly, with the information from the wearable device, the target user can securely realize that the current place is a photography spot and can immediately take a picture with the mobile information terminal.

Note that in a case where a plurality of clients 12 performs processing in cooperation, all clients 12 do not necessarily perform communication with the server 11 and only a part of the clients 12 may perform communication with the server 11. Then, a client 12 that communicates with the server 11 may control the other clients 12 to execute presentation of a presented application, or the like. For example, in a case of performing communication with the server 11 and receiving an application list from the server 11, the mobile information terminal may communicate with a wearable terminal and may make the wearable terminal execute presentation of a presented application, or the like.

Also, for example, in the presenting method in each of FIG. 10 and FIG. 11, in a case where an arbitrary position in an area A2 on a screen 311 is touched with a finger 302, it is possible to display an icon near a position touched with the finger 302.

Moreover, in each of FIG. 10 to FIG. 14, an example in which a target user touches a screen with a finger and performs operation has been illustrated. However, for example, a presenting method in each of FIG. 10 to FIG. 14 can be also applied to a case where an arbitrary position on a screen is specified and operation is performed by a method other than touching with a finger. For example, a presenting method in each of FIG. 10 to FIG. 14 can be also applied to a case where a mouse or a stylus pen is used or a touchless interface is used.

Also, an operation direction, the number of icons, a position of an icon, and the like illustrated in each of FIG.

10 to FIG. 14 are examples and can be modified when necessary. Also, the presenting methods in FIG. 10 to FIG. 14 may be combined in a possible range when being used.

Moreover, for example, a user may be able to set a rule related to an automatically-activated application or an application to be presented. For example, a presentation control unit 232 of a client 12 may present an application an activation probability of which in a certain situation is equal to or higher than a predetermined threshold and a user may perform setting in such a manner that automatic activation is always performed or order of priority in presentation becomes high in the situation when necessary. Alternatively, for example, the presentation control unit 232 may present an application an activation probability of which in a situation is lower than a predetermined threshold and a user may perform setting in such a manner that presentation is not performed or order of priority in presentation becomes low in the situation.

{Modification Example Related to Function Division}

The above-described division of a function of a server 11 and a client 12 is an example and can be modified arbitrarily.

For example, a function corresponding to a learning unit 132 and a selection unit 133 of the server 11 may be provided in the client 12 and learning processing (generation of activation prediction model), and selection and presentation of a presented application may be performed simply by the client 12 without the server 11.

Also, for example, a function corresponding to the selection unit 133 of the server 11 may be provided in the client 12. The client 12 may receive a learning result (such as activation prediction model) from the server 11 and may select and present a presented application on the basis of the received learning result.

Also, in a case where selection of a presented application is performed in the client 12, for example, the client 12 may transmit an application list indicating a selection result to a different device (such as device that operate in cooperation with above-described client 12).

{Configuration Example of Computer}

The series of above-described processing can be executed by hardware or by software. When the series of processing is executed by software, a program included in the software is installed into a computer. Here, the computer may be a computer embedded in special hardware or may be, for example, a general personal computer that can execute various functions by installation of various programs.

Note that a program executed by the computer may be a program in which processing is performed in time series in order described in the present description or may be a program in which processing is performed in parallel or at necessary timing such as at performance of a call.

Also, in the present description, a system means an aggregation of a plurality of components (device, module (part), and the like) and all components are not necessarily in the same housing. Thus, both of a plurality of devices, which is housed in different housings and is connected to each other through a network, and one device in which a plurality of modules is housed in one housing are systems.

Moreover, an embodiment of the present technology is not limited to the above-described embodiment and various modifications can be made within the spirit and the scope of the present technology.

For example, the present technology may include a configuration of cloud computing in which one function is divided by a plurality of devices through a network and processing is performed in cooperation.

Also, each step described in the above flowchart can be executed by one device or can be divided and executed by a plurality of devices.

Moreover, in a case where a plurality of kinds of processing is included in one step, the plurality of kinds of processing included in the one step can be executed by one device or can be divided and executed by a plurality of devices.

Moreover, an effect described in the present description is just an example and not the limitation. There may be a different effect.

Furthermore, for example, the present technology may include the following configuration.

(1)

An information processing device including: an information acquisition unit that acquires first information indicating a current situation including a current date and time and a current position of a user; and a selection unit that selects a presented application, which is an application program presented to the user, on the basis of a use history, a profile of the user, and the first information, the use history being a use history of an application program of the user and including second information indicating a situation in activation which situation includes a date and time and a position of the user in activation of each application program.

(2)

The information processing device according to (1), wherein the selection unit selects the presented application on the basis of a use history of a different user.

(3)

The information processing device according to (2), wherein the different user is a user similar to the user.

(4)

The information processing device according to (3), wherein the similar user is a user retaining a similar application program with the user.

(5)

The information processing device according to any one of (2) to (4), wherein the selection unit selects the presented application by using models that predict an activation probability of each application program and that are a first model generated on the basis of the use history of the user and a second model generated on the basis of the use history of the different user.

(6)

The information processing device according to any one of (1) to (4), wherein the selection unit selects the presented application from an application program, which is selected by utilization of a model of predicting an activation probability of each application program, and an application program similar to the selected application program.

(7)

The information processing device according to (6), wherein the similar application program is an application program a distribution of a retaining user of which program is similar to that of the selected application program.

(8)

The information processing device according to any one of (1) to (7), further including a display control unit that controls a display of an icon indicating the presented application on a predetermined screen, wherein the selection unit sets order of priority of the presented application, and when predetermined operation is performed on the screen, the display control unit displays a plurality of icons on the screen according to the order of priority and displays an icon of a presented application with high priority near a position where the operation is performed.

(9)

The information processing device according to any one of (1) to (7), further including a display control unit that controls a display of an icon indicating the presented application on a predetermined screen, wherein the selection unit sets order of priority of the presented application, and the display control unit arranges and displays a plurality of icons on the screen according to the order of priority, and increases a distance between an icon of a presented application with high priority and an adjoining icon.

(10)

The information processing device according to any one of (1) to (7), further including a display control unit that controls a display of an icon indicating the presented application on a predetermined screen, wherein the selection unit sets order of priority of the presented application, and the display control unit switches the icon displayed on the screen in accordance with the order of priority in response to a moving distance of a position specified by the user on the screen, and adjusts the moving distance necessary for switching the icon displayed on the screen according to the order of priority.

(11)

The information processing device according to any one of (1) to (7), further including a display control unit that controls a display of an icon indicating the presented application on a predetermined screen, wherein the selection unit sets order of priority of the presented application, and the display control unit arranges and displays a plurality of icons on the screen according to the order of priority, switches the icon displayed on the screen according to the order of priority in a case where a position specified by the user on the screen moves in a predetermined first direction, and switches the icon displayed on the screen according to opposite order of priority in a case where the specified position moves in a second direction different from the first direction.

(12)

The information processing device according to any one of (1) to (7), further including a display control unit that distinctively displays, on the screen, an icon indicating a presented application retained by the user and an icon indicating a presented application that is not retained by the user.

(13)

The information processing device according to any one of (1) to (7), further including a display control unit that controls a display of an icon indicating the presented application on a lock screen on which user operation is limited, and an execution control unit that releases the limitation in the user operation when the icon is selected and that brings the presented application corresponding to the selected icon into a usable state.

(14)

The information processing device according to any one of (1) to (13), wherein the situation in the activation includes a state of the user in activation of an application program, and the current situation includes a current state of the user.

(15)

The information processing device according to any one of (1) to (4) and (7) to (14), further including a learning unit that generates a model of predicting an activation probability of each application program, wherein the selection unit selects the presented application by using the model.

(16)

The information processing device according to (15), wherein the learning unit generates, by using a predetermined periodic function, at least one of a first model of predicting an activation probability of each application program at a specified date and time and a second model of setting a plurality of representative points and predicting an activation probability of each application program at a specified position on the basis of the activation probability of each application at each of the representative points.

(17)

The information processing device according to any one of (1) to (16), further including a communication unit that transmits information indicating a selection result of the presented application to a different information processing device.

(18)

The information processing device according to any one of (1) to (17), further including an execution control unit that brings the presented application into a usable state regardless of user operation.

(19)

An information processing method including: an information acquisition step of acquiring first information indicating a current situation including a current date and time and a current position of a user; and a selection step of selecting a presented application, which is an application program presented to the user, on the basis of a use history, a profile of the user, and the first information, the use history being a use history of an application program of the user and including second information indicating a situation in activation which situation includes a date and time and a position of the user in activation of each application program.

(20)

A program that causes a computer to execute processing including an information acquisition step of acquiring first information indicating a current situation including a current date and time and a current position of a user, and a selection step of selecting a presented application, which is an application program presented to the user, on the basis of a use history, a profile of the user, and the first information, the use history being a use history of an application program of the user and including second information indicating a situation in activation which situation includes a date and time and a position of the user in activation of each application program.

REFERENCE SIGNS LIST

1 Information processing system
11 Server
12-1 to 12-n Client
101 CPU
109 Communication unit
131 Information acquisition unit
132 Learning unit
133 Selection unit
134 Presentation control unit
141 Feature amount vector generation unit
142 Model learning unit
151 Score calculation unit
152 Similar application searching unit
153 Presented application selection unit
161 Application providing unit
162 Application list generation unit
201 CPU
206 Input unit
207 Output unit
208 Sensor unit 210 Communication unit
231 Information acquisition unit
232 Presentation control unit
241 Display control unit
242 Execution control unit
301 Smartphone
302 Finger
311 Screen
321 Button
326a to 326d, 341a to 341f, 361a to 361e, 381a, 381b, 401a to 401e Icon

The invention claimed is:

1. An information processing device, comprising: processing circuitry configured to acquire first information indicating a current situation including a current date and time and a current position of a user;
   set an order of priority of a plurality of application programs on the basis of a use history, a profile of the user, and the first information, the use history being a use history of the plurality of application programs and including second information indicating each situation in activation of each application program of the plurality of application programs, the second information including a date and time and a position of the user in the activation of the each application program;
   control a display of a plurality of icons corresponding to the plurality of application programs on a screen of a mobile information terminal based on the order of the priority;
   switch from a display of a first icon corresponding to a first application program to a display of a second icon corresponding to a second application program in response to a first user touch operation on the screen, the first user touch operation being a first moving operation from a first location on the screen to a second location on the screen, a moving distance of the first moving operation being a first distance; and
   switch from the display of the second icon corresponding to the second application program to a display of a third icon corresponding to a third application program in response to a second user touch operation on the screen, the second user touch operation being a second moving operation from the second location on the screen to a third location on the screen, a moving distance of the second moving operation being a second distance,
   wherein the priority of the first application program is higher than the second application program, and the priority of the second application program is higher than the third application program, and
   the first distance is longer than the second distance.

2. The information processing device according to claim 1, wherein the circuitry is configured to set the order of the priority on the basis of a use history of a different user.

3. The information processing device according to claim 2, wherein the different user is a user similar to the user.

4. The information processing device according to claim 3, wherein the similar user is a user retaining a similar application program with the user.

5. The information processing device according to claim 2, wherein the circuitry is configured to set the order of the priority by using models that predict an activation probability of each application program and that are a first model generated on the basis of the use history of the user and a second model generated on the basis of the use history of the different user.

6. The information processing device according to claim 1, wherein the circuitry is configured to set the order of the priority of the application programs by utilization of a model of predicting an activation probability of each application program, and similarity to the application program selected based on the model.

7. The information processing device according to claim 6, wherein the similarity is determined based on a distribution of a retaining user of the application program.

8. The information processing device according to claim 1, wherein in response to detecting that a predetermined operation is performed on the screen, the processing circuitry controls a display of the icons such that the icon with higher priority is displayed closer to a position where the operation is performed, and that the icon with lower priority is displayed farther to the position where the operation is performed.

9. The information processing device according to claim 1, wherein the processing circuitry is configured to control a display of the icons such that a distance between the icon with higher priority and an adjoining icon of the icon with higher priority is longer than a distance between the icon with lower priority and an adjoining icon of the icon with lower priority.

10. The information processing device according to claim 1, wherein the processing circuitry is configured to switch the icons displayed on the screen according to the order of the priority in a case where a position specified by the user on the screen moves in a predetermined first direction, and switch the icons displayed on the screen according to an order opposite to the order of the priority in a case where the specified position moves in a second direction different from the first direction.

11. The information processing device according to claim 1, wherein the processing circuitry is configured to control the display of the plurality of icons such that an icon indicating an application program retained by the user is displayed in a different way from an icon indicating an application program that is not retained by the user.

12. The information processing device according to claim 1, wherein the processing circuitry is configured to:
   control the display of the plurality of icons on a lock screen on which user operation is limited;
   release the limitation in the user operation in response to the icon being selected; and
   set the selected icon into a usable state.

13. The information processing device according to claim 1, wherein the situation in the activation includes a state of the user in activation of an application program, and the current situation includes a current state of the user.

14. The information processing device according to claim 1, wherein the processing circuitry is configured to:
   generate a model of predicting an activation probability of each application program; and
   set the order of the priority of the plurality of application programs by using the model.

15. The information processing device according to claim 14, wherein the processing circuitry is configured to generate, by using a predetermined periodic function, at least one of a first model of predicting an activation probability of each application program at a specified date and time and a second model of setting a plurality of representative points and predicting an activation probability of each application program at a specified position on the basis of the activation probability of each application at each of the representative points.

16. The information processing device according to claim 1, wherein the processing circuitry is configured to transmit information indicating the order of the priority to a different information processing device.

17. The information processing device according to claim 1, wherein the processing circuitry is configured to bring the application program into a usable state regardless of user operation.

18. An information processing method, comprising:
acquiring first information indicating a current situation including a current date and time and a current position of a user;
setting, using processing circuitry, an order of priority of a plurality of application programs on the basis of a use history, a profile of the user, and the first information, the use history being a use history of the plurality of application programs and including second information indicating each situation in activation of each application program of the plurality of application programs, the second information including a date and time and a position of the user in the activation of the each application program;
controlling a display of a plurality of icons corresponding to the plurality of application programs on a screen of a mobile information terminal based on the order of the priority;
switching from a display of a first icon corresponding to a first application program to a display of a second icon corresponding to a second application program in response to a first user touch operation on the screen, the first user touch operation being a first moving operation from a first location on the screen to a second location on the screen, a moving distance of the first moving operation being a first distance; and
switching from the display of the second icon corresponding to the second application program to a display of a third icon corresponding to a third application program in response to a second user touch operation on the screen, the second user touch operation being a second moving operation from the second location on the screen to a third location on the screen, a moving distance of the second moving operation being a second distance,
wherein the priority of the first application program is higher than the second application program, and the priority of the second application program is higher than the third application program, and
the first distance is longer than the second distance.

19. A non-transitory computer readable medium including executable instructions, which when executed by a computer cause the computer to execute an information processing method, the method comprising:
acquiring first information indicating a current situation including a current date and time and a current position of a user;
setting an order of priority of a plurality of application programs on the basis of a use history, a profile of the user, and the first information, the use history being a use history of the plurality of application programs and including second information indicating each situation in activation of each application program of the plurality of application programs, the second information including a date and time and a position of the user in the activation of the each application program;
controlling a display of a plurality of icons corresponding to the plurality of application programs on a screen of a mobile information terminal based on the order of the priority;
switching from a display of a first icon corresponding to a first application program to a display of a second icon corresponding to a second application program in response to a first user touch operation on the screen, the first user touch operation being a first moving operation from a first location on the screen to a second location on the screen, a moving distance of the first moving operation being a first distance; and
switching from the display of the second icon corresponding to the second application program to a display of a third icon corresponding to a third application program in response to a second user touch operation on the screen, the second user touch operation being a second moving operation from the second location on the screen to a third location on the screen, a moving distance of the second moving operation being a second distance,
wherein the priority of the first application program is higher than the second application program, and the priority of the second application program is higher than the third application program, and
the first distance is longer than the second distance.

* * * * *